US012124953B2

(12) United States Patent
Endresen et al.

(10) Patent No.: US 12,124,953 B2
(45) Date of Patent: Oct. 22, 2024

(54) INTERACTIVE QUALITATIVE-QUANTITATIVE LIVE LABELING FOR DEEP LEARNING ARTIFICIAL INTELLIGENCE

(71) Applicant: BLUWARE, INC., Houston, TX (US)

(72) Inventors: Paul Endresen, Boulder, CO (US); Daniel Piette, Houston, TX (US); Benjamin Lartigue, Houston, TX (US)

(73) Assignee: BLUWARE, INC., Houston, TX (US)

( * ) Notice: Subject to any disclaimer, the term of this patent is extended or adjusted under 35 U.S.C. 154(b) by 0 days.

(21) Appl. No.: 17/979,486

(22) Filed: Nov. 2, 2022

(65) Prior Publication Data

US 2023/0162029 A1    May 25, 2023

Related U.S. Application Data

(63) Continuation of application No. PCT/US2021/060729, filed on Nov. 24, 2021.

(51) Int. Cl.
*G06N 3/08*     (2023.01)
*G06N 20/00*    (2019.01)

(52) U.S. Cl.
CPC .............. *G06N 3/08* (2013.01); *G06N 20/00* (2019.01)

(58) Field of Classification Search
CPC .................................. G06N 3/08; G06N 20/00
See application file for complete search history.

(56) References Cited

U.S. PATENT DOCUMENTS

| 10,318,848 B2 | 6/2019 | Dijkman et al. |
| 10,318,882 B2 | 6/2019 | Brueckner et al. |
| 10,380,498 B1 | 8/2019 | Chaoji et al. |
| 10,719,301 B1 | 7/2020 | Dasgupta et al. |

(Continued)

FOREIGN PATENT DOCUMENTS

| WO | 2020205597 A1 | 10/2020 |
| WO | 2021126370 A1 | 6/2021 |

OTHER PUBLICATIONS

Tan, Mingxing, and Quoc Le. "Efficientnet: Rethinking model scaling for convolutional neural networks." International conference on machine learning. PMLR, 2019. (Year: 2019).*

(Continued)

*Primary Examiner* — Michael J Huntley
*Assistant Examiner* — Sehwan Kim
(74) *Attorney, Agent, or Firm* — Basil M. Angelo; ANGELO IP

(57) ABSTRACT

A live model of a deep learning algorithm may be used to generate predictions of features of interest in an instance of training data. If the predictions correspond to actual features of interest, the predictions may be converted to qualitative labels, the instance may be designated as being acceptably labeled, and the live model may be trained on all instances of training data designated as acceptably labeled to update the live model. If the predictions do not correspond, a repetitive process of applying qualitative labels to features of interest in the instance of training data, quantitatively training on the qualitatively labeled instance of training data and all instances of training data designated as acceptably labeled, and generating predictions of features of interest until the predictions correspond to the actual features of interest.

8 Claims, 17 Drawing Sheets

(56) References Cited

U.S. PATENT DOCUMENTS

| | | | |
|---|---|---|---|
| 10,896,352 | B2 | 1/2021 | Hsieh et al. |
| 10,991,048 | B1 | 4/2021 | Blair et al. |
| 11,049,044 | B1* | 6/2021 | Habenschuss ............ G06N 3/08 |
| 2003/0087329 | A1 | 5/2003 | Haynes et al. |
| 2005/0216426 | A1 | 9/2005 | Weston et al. |
| 2018/0232567 | A1 | 8/2018 | Dolsma et al. |
| 2018/0286038 | A1 | 10/2018 | Jalali et al. |
| 2019/0362235 | A1 | 11/2019 | Xu et al. |
| 2019/0365341 | A1 | 12/2019 | Chan et al. |
| 2020/0050443 | A1 | 2/2020 | Edelsten et al. |
| 2020/0104774 | A1 | 4/2020 | Sun et al. |
| 2020/0311559 | A1 | 10/2020 | Chattopadhyay et al. |
| 2020/0349674 | A1 | 11/2020 | Ramanujam et al. |
| 2021/0012553 | A1 | 1/2021 | Apodaca et al. |
| 2021/0097444 | A1 | 4/2021 | Bansal et al. |
| 2021/0097641 | A1 | 4/2021 | Iyer et al. |
| 2021/0110089 | A1 | 4/2021 | Chen et al. |
| 2021/0125290 | A1 | 4/2021 | Manhaes et al. |
| 2021/0374474 | A1* | 12/2021 | Shen ................ G06V 10/7753 |
| 2022/0115096 | A1* | 4/2022 | Kapur ................... G16H 40/63 |
| 2022/0147769 | A1* | 5/2022 | Tran ...................... G06V 10/82 |
| 2022/0188519 | A1* | 6/2022 | Briody ..................... G06N 3/08 |

OTHER PUBLICATIONS

Koehrsen. "Overfitting vs. Underfitting: a Complete Example." Towards Data Science. Jan. 28, 2018 (Jan. 28, 2018) Retrieved on Feb. 21, 2022 from https://towardsdatascience.com/overfitting-vs-underfitting-a-complete-example-d05dd7e19765.

Leppink. "Revisiting the quantitative-qualitative-mixed methods labels: Research questions, developments, and the new for replication." Journal of Taibah University Medical Sciences 12.2 (2017): 97-101. Jan. 5, 2017 (Jan. 5, 2017) Retrieved on Feb. 21, 2022 from https://www.ncbi.nlm.nih.gov/pmc/articles/PMC6695002/.

PCT International Search Report issued for PCT International Application PCT/US2021/060729, filed on Nov. 24, 2021, mailed on Feb. 15, 2022.

PCT Written Opinion issued for PCT International Application PCT/US2021/060729, filed on Nov. 24, 2021, mailed on Feb. 15, 2022.

Perez-Dattari, R. "Continuous Control for High-Dimensional State Spaces: an Interactive Learning Approach", 2019 International Conference on Robotics and Automation (ICRA), Published May 20, 2019. Retrieved on Aug. 31, 2022 from https://doi.org/10.1109/ICRA.2019.8793675.

Shah, S. "A System for Real-Time Interactive Analysis of Deep Learning Training", Published in the Proceedings of the ACM SIGCHI Symposium on Engineering Systems 2019, Published on Jun. 18, 2019. Retrieved on Aug. 31, 2022 from https://doi.org/10.1145/3319499.3328231.

Van Valen et al. "Deep learning automates the quantitative analysis of individual cells in live-cell imaging experiments." PLoS computational biology 12.11 (2016): e1005177. Nov. 4, 2016 (Nov. 4, 2016) Retrieved on Feb. 21, 2022 from https://journals.plos.org/ploscompbiol/article?id=10.1371/journal.pcbi.1005177.

Yang, B. "An Online Chronic Disease Prediction System Based on Incremental Deep Neural Network", Published in STM Source 67(1): 951-964, Published on Apr. 1, 2021. Retrieved on Aug. 30, 2022 from https://doi.org/10.32604/cmc.2021.014839.

PCT International Search Report of the International Search Authority (USPTO) for PCT International Application PCT/US2022/052955, filed on Dec. 15, 2022, mailed on Mar. 21, 2023.

PCT Written Opinion of the International Search Authority (USPTO) for PCT International Application PCT/US2022/052955, filed on Dec. 15, 2022, mailed on Mar. 21, 2023.

* cited by examiner

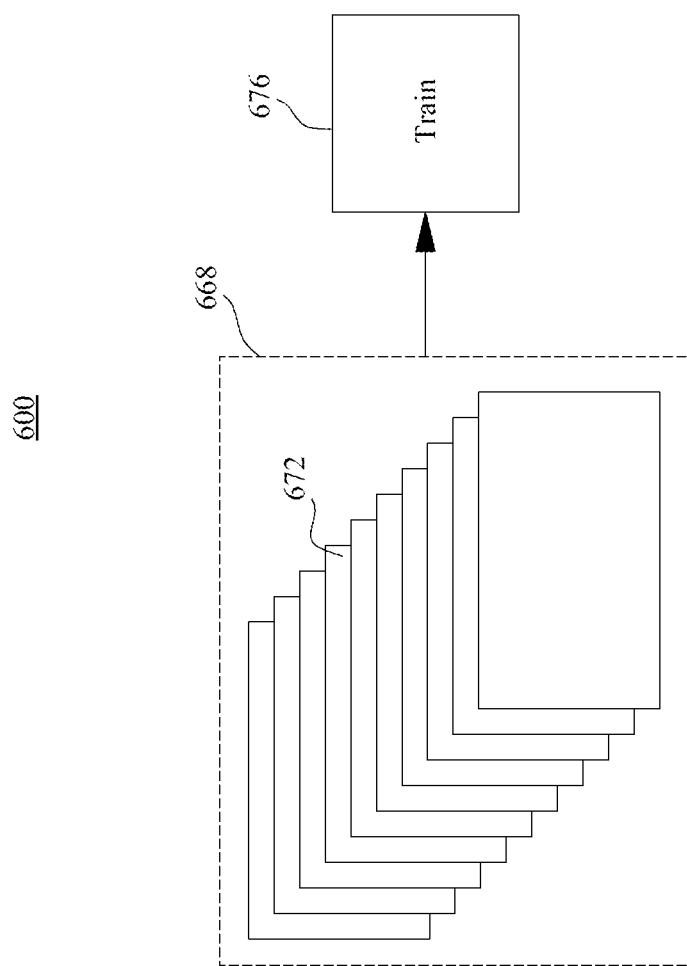

700a

700b

ABSTRACT

INTERACTIVE QUALITATIVE-QUANTITATIVE LIVE LABELING FOR DEEP LEARNING ARTIFICIAL INTELLIGENCE

CROSS-REFERENCE TO RELATED APPLICATIONS

This application is a continuation of PCT International Application PCT/US2021/060729, filed on Nov. 24, 2021, which claims the benefit of, or priority to, U.S. Provisional Patent Application Ser. No. 63/291,070, filed on Dec. 17, 2021, both of which are hereby incorporated by reference in their entirety for all purposes.

BACKGROUND OF THE INVENTION

Artificial Intelligence ("AI") is a term of art in the interdisciplinary field of computer science, mathematics, data science, and statistics that generally refers to hardware systems and software algorithms that perform tasks, not intuitively programmatic, that are thought of as requiring some aspect of human intelligence such as, for example, visual perception, object detection, pattern recognition, natural language processing, speech recognition, translation, and decision making. In essence, AI seeks to develop algorithms that mimic human intelligence to perform tasks and improve in the performance of those tasks over time. The promise of these techniques is a more efficient alternative to capture knowledge in data and gradually improve the performance of predictive models, thereby enabling data-driven decision making. While AI remains an exceptionally broad area of research, recent advancements in machine learning and, more specifically, deep learning have led to a paradigm shift in the creation of predictive models that have widespread application across industries.

Machine learning is an application of AI that generally refers to hardware systems and software algorithms that are said to learn from the experience of processing data. In essence, machine learning algorithms learn to make predictions from data, without requiring explicit programming to do so. Machine learning algorithms are broadly categorized as reinforcement learning algorithms, unsupervised learning algorithms, semi-supervised learning algorithms, and supervised learning algorithms.

Reinforcement learning algorithms are goal-oriented algorithms that seek to optimize a mathematical objective without any external input. In reinforcement learning nomenclature, an agent is said to interact with an environment in accordance with a policy, take action in accordance with the policy, and adjust the policy based on a reward function of the prior action. In this way, reinforcement learning algorithms search the solution space using feedback to advance toward a goal. Reinforcement learning algorithms are sometimes referred to as self-contained algorithms because they do not require labeled training data, training on labeled training data, or human intervention. Unsupervised learning algorithms are pattern identification algorithms that are used to gain insight into large datasets by categorizing data without any external input. Unsupervised learning algorithms are said to self-discover broad patterns in large datasets and are typically used in clustering, association, and dimensionality reduction applications. Unsupervised learning algorithms are also self-contained algorithms that do not require labeled training data, training on labeled training data, or human intervention. While computationally complex, and less accurate than other machine learning techniques, reinforcement and unsupervised learning algorithms learn from data while processing it in real-time.

Semi-supervised learning algorithms are a hybrid of unsupervised and supervised learning algorithms. In semi-supervised learning algorithms, a small sample of training data, taken from a larger dataset, is manually labeled. The small sample of manually labeled data is then used to train a model that is then used to label the remaining data in the training dataset prior to presentment of the entire labeled training dataset to the model for extensive training. As such, only a small portion of the training dataset is qualitatively labeled, and the remaining data is labeled by the model. A significant drawback to this approach is that the quality of the labeling effort is not known until the entire training dataset has been labeled, whether manually or by the model, and then fully trained on the model. The small amount of labeled training data used to train the model typically results in low-quality labels on the model-labeled instances of data in the training dataset, thereby frustrating efforts to train the model and resulting in a trained model that performs poorly, if a trained model can be generated at all. As such, semi-supervised learning typically only finds application in cases where there is not enough labeled data to produce a trained model with a supervised learning algorithm, and there is no feedback as to the quality of the labeling effort until a significant effort has been made.

Supervised learning algorithms differ from reinforcement, unsupervised, and semi-supervised learning algorithms in that supervised learning algorithms require a significant amount of training data to be accurately labeled in advance of extensive training on a model. The training dataset is manually labeled in a labor-intensive process that can take days, weeks, or months to complete depending on the complexity of the application. After the entire training dataset is labeled, the model is extensively trained on the labeled training dataset in a process that takes further days, weeks, or months to complete. The quality of the labeling effort may be evaluated only after having fully labeled the training dataset and having fully trained on the labeled training dataset. As such, it typically requires several iterations of labeling, training, and evaluating to generate a suitably trained model, in a complicated, time consuming, and costly process. While supervised learning algorithms are considered highly effective for complex applications, a significant drawback to this approach is that the quality of the labeling effort may only be evaluated after the training dataset has been labeled and the model has been extensively trained on the labeled training dataset. Notwithstanding these challenges, supervised learning algorithms are at the forefront of deep learning and show great promise for future applications.

BRIEF SUMMARY OF THE INVENTION

According to one aspect of one or more embodiments of the present invention, a method of interactive qualitative-quantitative live labeling a training dataset may include, for each instance of training data in the training dataset to be labeled, generating one or more predictions of features of interest in an instance of training data with a live model of a deep learning algorithm, converting the one or more predictions of features of interest in the instance of training data to one or more provisional qualitative labels applied to the instance of training data, and determining whether the one or more predictions of features of interest in the instance of training data are substantially the same as one or more features of interest in the instance of training data. If the one or more predictions of features of interest in the instance of training data are not substantially the same as the one or more features of interest in the instance of training data, repetitively: qualitatively labeling one or more features of interest in the instance of training data by applying one or more qualitative labels, quantitatively training the live model on the qualitatively labeled instance of training data and all instances of training data designated as acceptably labeled to update the live model, generating one or more predictions of features of interest in the instance of training data with the updated live model, and comparing the one or more predictions of features interest in the instance of training data to the one or more qualitative labels applied to the instance of training data, until the one or more predictions of features interest in the instance of training data are substantially the same as the one or more qualitative labels applied to the instance of training data and then designating the instance of training data as acceptably labeled. Advantageously, the amount of time required to qualitatively label each instance of training data in the training dataset decreases over time as additional instances of training data are designated as acceptably labeled and used to update the live model.

According to one aspect of one or more embodiments of the present invention, a computer-implemented method of interactive qualitative-quantitative live labeling a training dataset includes for each instance of training data in the training dataset to be labeled: generating one or more predictions of features of interest in an instance of training data with a live model of a deep learning algorithm, converting the one or more predictions of features of interest in the instance of training data to one or more provisional qualitative labels applied to the instance of training data, and receiving a determination of whether the one or more predictions of features of interest in the instance of training data are substantially the same as one or more features of interest in the instance of training data. If the one or more predictions of features of interest in the instance of training data are not substantially the same as the one or more features of interest in the instance of training data, repetitively: receiving one or more qualitative labels applied to one or more features of interest in the instance of training data, quantitatively training the live model on the qualitatively labeled instance of training data and all instances of training data designated as acceptably labeled to update the live model, generating one or more predictions of features of interest in the instance of training data with the updated live model, and comparing the one or more predictions of features interest in the instance of training data to the one or more qualitative labels applied to the instance of training data, until the one or more predictions of features interest in the instance of training data are substantially the same as the one or more qualitative labels applied to the instance of training data and then designating the instance of training data as acceptably labeled. Advantageously, an amount of time required to qualitatively label each instance of training data in the training dataset decreases over time as additional instances of training data are designated as acceptably labeled and used to update the live model.

According to one aspect of one or more embodiments of the present invention, a non-transitory computer-readable medium comprising software instructions that, when executed by a processor, performs a method of interactive qualitative-quantitative live labeling a training dataset includes for each instance of training data in the training dataset to be labeled: generating one or more predictions of features of interest in an instance of training data with a live model of a deep learning algorithm, converting the one or more predictions of features of interest in the instance of training data to one or more provisional qualitative labels applied to the instance of training data, and receiving a determination of whether the one or more predictions of features of interest in the instance of training data are substantially the same as one or more features of interest in the instance of training data. If the one or more predictions of features of interest in the instance of training data are not substantially the same as the one or more features of interest in the instance of training data, repetitively: receiving one or more qualitative labels applied to one or more features of interest in the instance of training data, quantitatively training the live model on the qualitatively labeled instance of training data and all instances of training data designated as acceptably labeled to update the live model, generating one or more predictions of features of interest in the instance of training data with the updated live model, and comparing the one or more predictions of features interest in the instance of training data to the one or more qualitative labels applied to the instance of training data, until the one or more predictions of features interest in the instance of training data are substantially the same as the one or more qualitative labels applied to the instance of training data and then designating the instance of training data as acceptably labeled. Advantageously, an amount of time required to qualitatively label each instance of training data in the training dataset decreases over time as additional instances of training data are designated as acceptably labeled and used to update the live model.

Other aspects of the present invention will be apparent from the following description and claims.

BRIEF DESCRIPTION OF THE DRAWINGS

FIG. 6B shows training an intended model of a deep learning algorithm on a labeled training dataset generated by a method of interactive qualitative-quantitative live labeling in accordance with one or more embodiments of the present invention.

DETAILED DESCRIPTION OF THE INVENTION

Figure 1:
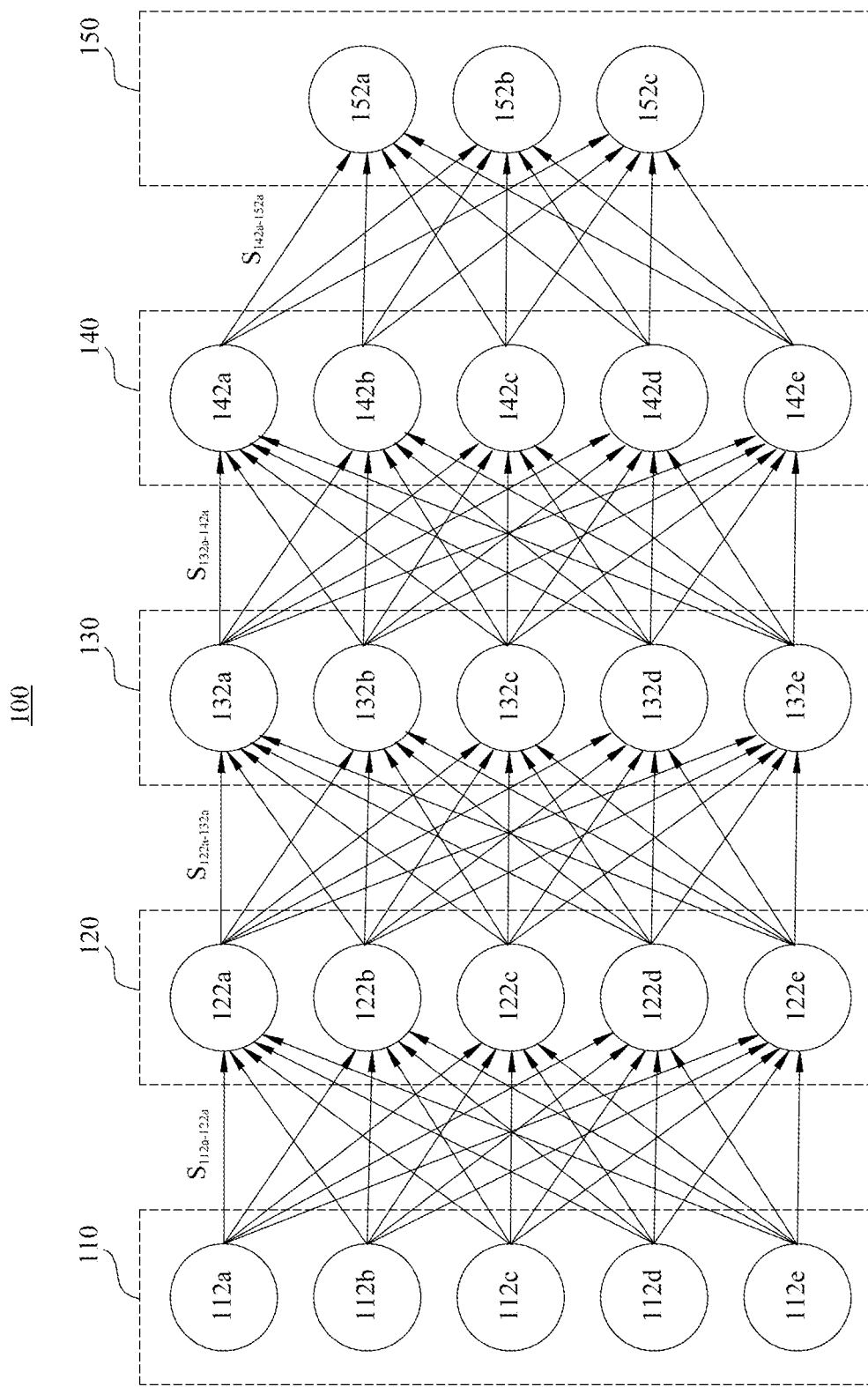
FIG. 1 shows an example of an artificial neural network that may be used in a deep learning application of machine learning artificial intelligence.

One or more embodiments of the present invention are described in detail with reference to the accompanying figures. For consistency, like elements in the various figures are denoted by like reference numerals. In the following detailed description of the present invention, specific details are described to provide a thorough understanding of the present invention. In other instances, aspects that are well-known to those of ordinary skill in the art are not described to avoid obscuring the description of the present invention.

Deep learning is a supervised learning application of machine learning AI that uses multi-layered, or deep, learning algorithms, such as, for example, deep artificial neural networks. Deep learning algorithms require extensive training on an accurately labeled training dataset to generate a trained model for operative use. Each instance of training data in a training dataset must be meticulously and accurately labeled to identify one or more aspects or features of interest. The deep learning algorithm must then be extensively trained on the labeled training dataset to generate a trained model, if one can be generated at all. When presented with a large amount of accurately labeled training data and extensive subsequent training, trained models have proven highly effective in complex applications. As such, labeling a training dataset is one of the most important tasks in generating a trained model in deep learning applications.

Labeling is the process of qualitatively annotating, marking up, or identifying aspects or features of interest in a training dataset, typically performed in advance of training under conventional labeling processes. During training, the labeled training dataset is used to train a model of a deep learning algorithm to identify or predict aspects or features of interest in new data of first impression in a manner consistent with the labeled aspects or features of interest in the labeled training dataset. Training is the process of parameterizing a model of a deep learning algorithm based on a labeled training dataset in an effort to generate a trained model for operative use. Specifically, the training process attempts to determine a set of model parameters, such as, for example, a set of model weights, that map inputs to outputs in a manner consistent with what was learned from the labeled training dataset. For the training process to succeed, a large and accurately labeled training dataset must be presented to the model of the deep learning algorithm for extensive training. If the training process succeeds, a trained model is generated. The trained model is a deep learning algorithm that is parameterized through training. In operative use, the trained model may then be used with new data of first impression to predict one or more features of interest in the new data, consistent with what was learned from the labeled training dataset. Consequently, the quality of the trained model, assuming one can be generated, is highly dependent on the quality of the labeling effort that is performed in advance of extensive training. For these reasons and others, qualitative labeling is widely considered the most important task in the development of a trained model in deep learning applications.

In many applications, the deep learning algorithm is an artificial neural network inspired by the biological neural network of the human brain. Artificial neural networks typically include an input layer corresponding to inputs to the algorithm, one or more intermediate layers, and an output layer corresponding to outputs of the algorithm. The configuration and capability of an artificial neural network is sometimes described by the network's depth, width, size, capacity, and architecture. Depth refers to the number of layers, sometimes referred to as node containers, other than the input layer, width refers to the number of nodes in a given layer and may vary from layer to layer, and size refers to the total number of nodes in the artificial neural network, where nodes are the fundamental units of the artificial neural network. The capacity typically refers to the type or structure of functions that can be learned and is sometimes referred to as the representational capacity of the artificial neural network. The architecture broadly refers to the arrangement of layers and nodes in the artificial neural network.

Each node, or artificial neuron, in an artificial neural network is connected to one or more other nodes by way of an artificial synapse. In a feed-forward fully connected architecture, each node in the given layer is connected to each node of the layer immediately following it by an artificial synapse. Similarly, each node in a given layer is connected to each node of the layer immediately preceding it by an artificial synapse. For a given node, the group of artificial synapses that connect each node of the layer immediately preceding the given node are considered input to the given node. Similarly, for a given node, the group of artificial synapses that connect the given node to each node of the layer immediately following the given node are considered output from the given node. In addition, each node may be characterized by a plurality of model weights applied to its inputs, an activation function, and a threshold function that governs the output to the nodes in the layer immediately following it. Specifically, a model weight may be applied to each artificial synapse that is input to a given node and the weighted inputs are summed. If the sum of weighted inputs exceeds that node's threshold, the node is said to be activated and outputs a value corresponding to a typically non-linear function of the weighted inputs, sometimes referred to as the activation function, to each node of the layer immediately following it. Conversely, if the sum of weighted inputs does not exceed the node's threshold, the node is said to be deactivated and does not output to the nodes of the layer immediately following it. In this way, a trained model of an artificial neural network, where the model parameters have been determined through the training process, functionally maps one or more inputs to one or more outputs in a manner consistent with what was learned from the labeled training data. In typical applications, a labeled training dataset is used to train the deep learning model, such as, for example, an artificial neural network, to produce a trained model that identifies or predicts aspects or features of interest in new data of first impression. Put another way, the training process may be thought of as an optimization problem that attempts to determine the model parameters, such as a set of model weights, and potentially other parameters, for the artificial neural network that effectively maps inputs to outputs based on the labeled training dataset.

FIG. 1 shows an example of a conventional artificial neural network 100 that may be used in a deep learning application of machine learning AI. From an architectural standpoint, artificial neural network 100 may include an input layer (e.g., 110), two or more intermediate layers (e.g., 120, 130, and 140), sometimes referred to as hidden layers because they are not directly observable from the system of inputs and outputs, and an output layer (e.g., 150). Each layer (e.g., 110, 120, 130, 140, and 150) may include a plurality of nodes, sometimes referred to as artificial neurons, (e.g., 112a-112e for layer 110, 122a-122e for layer 120, 132a-132e for layer 130, 142a-142e for layer 140, and 152a-152c for layer 150). The number of nodes per layer may not be the same.

Each node 112a-112e of input layer 110 may be connected to each node 122a-122e of intermediate layer 120 via an artificial synapse. For example, node 112a may be connected to node 122a via artificial synapse S112a-122a, node 112a may be connected to node 122b via artificial synapse S112a-122b (not labeled for clarity), node 112a may be connected to node 122c via artificial synapse S112a-122c (not labeled for clarity), node 112a may be connected to node 122d via artificial synapse S112a-122d (not labeled for clarity), and node 112a may be connected to node 122e via artificial synapse S112a-122e (not labeled for clarity). Each of the remaining nodes 112b-112e of input layer 110, may be connected to each node 122a-122e of intermediate layer 120 immediately following it in the same manner. Similarly, each node 122a-122e of intermediate layer 120 may be connected to each node 132a-132e of intermediate layer 130 via a plurality of artificial synapses (not labeled for clarity), each node 132a-132e of intermediate layer 130 may be connected to each node 142a-142e of intermediate layer 140 via a plurality of artificial synapses (not labeled for clarity), and each node 142a-143e of intermediate layer 140 may be connected to each node 152a-152c of output layer 150 via a plurality of artificial synapses (not labeled for clarity) in the same manner. In this way, each node is said to input an artificial synapse from each node in the layer immediately preceding it, and each node outputs an artificial synapse to each node in the layer immediately following it. Each node may be characterized by its weighted inputs, activation function, and outputs.

Similar to synaptic weights applied to the synapses input to a biological neuron, a model weight may be applied to each artificial synapse that is input to a given node. For example, with respect to the inputs to node 122a of intermediate layer 120, a model weight W112a-122a may be applied to artificial synapse S112a-122a originating from node 112a, a model weight W112b-122a may be applied to artificial synapse S112b-122a originating from node 112b, a model weight W112c-122a may be applied to artificial synapse S112c-122a originating from node 112c, a model weight W112d-122a may be applied to artificial synapse S112d-122a originating from node 112d, and a model weight W112e-122a may be applied to artificial synapse S112e-122a originating from node 112e. A model weight may be applied to each artificial synapse (not labeled for clarity) input to each of the remaining nodes 122b-122e of intermediate layer 120 in the same manner. Similarly, a model weight may be applied to each artificial synapse (not labeled for clarity) input to each node 132a-132e of intermediate layer 130, a model weight may be applied to each artificial synapse (not labeled for clarity) input to each node 142a-142e of intermediate layer 140, and a model weight may be applied to each artificial synapse (not labeled for clarity) input to each node 152a-152c of output layer 150. In this way, each artificial synapse input to a given node may have a different level of influence as to whether that node activates the next nodes in the layer immediately following it. The model weights are typically determined during the training process.

Each node 112a-112e, 122a-122e, 132a-132e, 142a-142e, and 152a-152c may include an activation function corresponding to a typically non-linear function of the sum of weighted inputs. For example, node 122a may include an activation function corresponding to a non-linear function of the sum of: a weighted value W112a-122a of input artificial synapse S112a-122a, a weighted W112b-122a value of input artificial synapse S112b-122a, a weighted W112c-122a value of input artificial synapse S112c-122a, a weighted value W112d-122a of input artificial synapse S112d-122a, and a weighted value W112e-122a of input artificial synapse S112e-122a. Each of the remaining nodes 122b-122e of intermediate layer 120 may include an activation function in the same manner. Similarly, each node 132a-132e of intermediate layer 130, each node 142a-142e of intermediate layer 140, and each node 152a-152c of output layer 150 may each include an activation function in the same manner. In operation, if the weighted sum of the inputs to a given node exceeds a node's threshold value, an activation function governs the output of that node to each node in the layer immediately following it. If the weighted sum of the inputs to the given node falls below the node's threshold value, the node does not output to the nodes in the layer immediately following it. In this way, artificial neural network 100 may be thought of as a function that maps data from input nodes 112a-112e of input layer 110 to output nodes 152a-152c of output layer 150 by way of intermediate layers 120, 130, and 140. The activation function is typically specified in advance and may vary from application to application.

During the training process, the model parameters are determined including, for example, one or more of model weights applied to inputs, the activation function or, if the activation function is specified in advance, parameters to the activation function, and threshold values for each node. In some applications, the activation function and threshold values may be specified in advance and the only model parameters determined during training are the model weights applied to inputs at each node. The model parameters are typically determined via an empirical optimization procedure, such as, for example, the stochastic gradient descent procedure. Notwithstanding, one of ordinary skill in the art will appreciate that other optimization processes may be used. The optimization problem presented by deep artificial neural networks can be challenging and the solution space may include local optima that make it difficult to converge on a solution. As such, the training process typically requires several passes through the labeled training dataset, where each pass through is referred to as an epoch.

The amount of change to the model parameters during each epoch is sometimes referred to as the learning rate, which corresponds to the rate at which the model is said to learn. However, the learning rate may best be described as controlling the amount of apportioned error that the model weights are updated with, each time they are updated in an epoch. Given an ideal learning rate, the model will learn to approximate the function for a given number of layers, nodes per layer, and training epochs. However, at the extremes, a learning rate that is too large will result in updates to model weights that are too large, and the performance of the model will tend to oscillate over epochs. Oscillating performance is typically caused by model weights that diverge during optimization and fail to reach solution. At the other extreme, a learning rate that is too small may never converge or may get stuck on a suboptimal solution, such as local optima. As such, the learning rate is important to ensuring that the empirical optimization procedure converges on a solution of model parameter values, resulting in a trained model. In ideal situations, the empirical optimization procedure will converge on a set of model weights that effectively map inputs to outputs consistent with what was learned from the labeled training dataset.

For these reasons, and others, it is critically important that the artificial neural network be provided with a sufficient amount of accurately labeled training data such that the artificial neural network can extensively train on the labeled training dataset and arrive at a set of model parameters that enable the trained model to effectively and accurately map each inputs to outputs in a manner consistent with what was learned from the labeled training dataset when presented with new data of first impression. When labeling and training are done properly, this achieves one of the most important advances in deep learning applications of machine learning AI, namely, transfer learning through trained models.

While artificial neural networks are commonly used in deep learning applications of machine learning AI, the underlying deep learning algorithm used to generate a trained model may be, for example, a convolutional neural network, a recurrent neural network, a long short-term memory network, a radical basis function network, a self-organizing map, a deep belief network, a restricted Boltzman machine, an autoencoder, any variation or combination thereof, or any other type or kind of deep learning algorithm that requires a significant amount of labeled training data to generate a trained model, as is well known in the art.

Figure 2A:
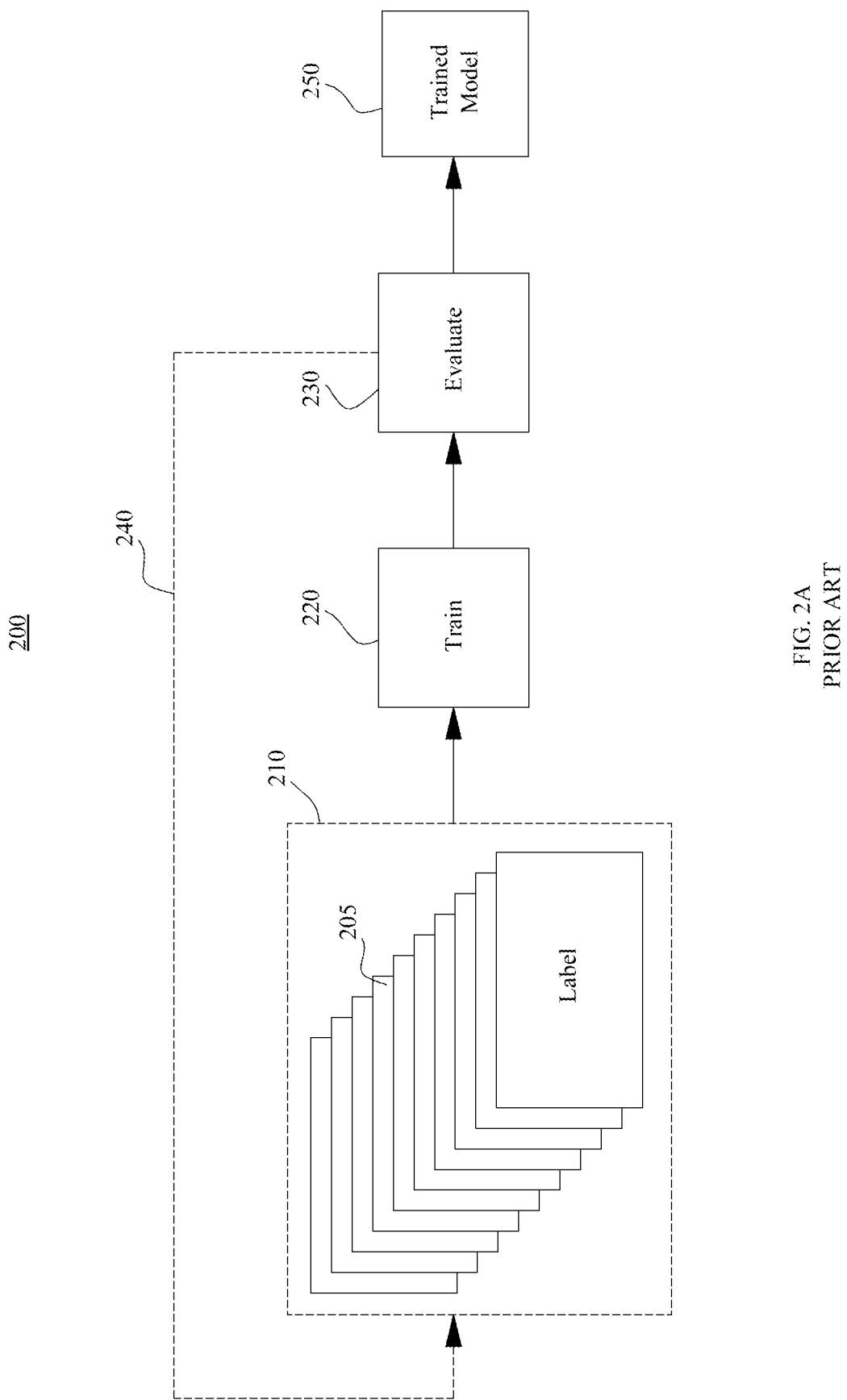
FIG. 2A shows the conventional process of iteratively labeling, training, and evaluating a model of an artificial neural network to generate a trained model.

FIG. 2A shows the conventional process 200 of iteratively 240 labeling 210, training 220, and evaluating 230 a model of a deep learning algorithm, such as, for example, an artificial neural network (e.g., 100 of FIG. 1), in an effort to generate a trained model 250. An inherent problem with deep learning applications of machine learning AI is that the front-end of the process requires a training dataset comprising a plurality of instances of training data 205 that must be meticulously and accurately labeled 210 in a manual and labor-intensive process that is prone to error. The conventional process 200 includes, as a preliminary exercise, manually labeling 210 each instance of training data 205 in the training dataset in an operation that is typically performed by one or more human operators. Only after the entire training dataset has been labeled 210, the model of the artificial neural network is extensively trained 220 on the labeled training dataset. As previously discussed, each iteration of the training process 220 may require several passes, or epochs, through the labeled training dataset. If the training process 220 successfully converges on a candidate model, comprising a set of model parameters for the artificial neural network it is based on, the candidate model must be evaluated 230 to determine whether the model accurately maps inputs to outputs in a manner consistent with what was learned from the labeled training dataset and is therefore suitable for use as a trained model 250. However, in complex applications with deep learning algorithms, early attempts at labeling 210 are rarely sufficient such that the process 200 typically requires several iterations 240 of labeling 210, training 220, and evaluating 230 in order to converge on a suitably trained model 250, if a trained model 250 can be generated at all.

Figure 2B:
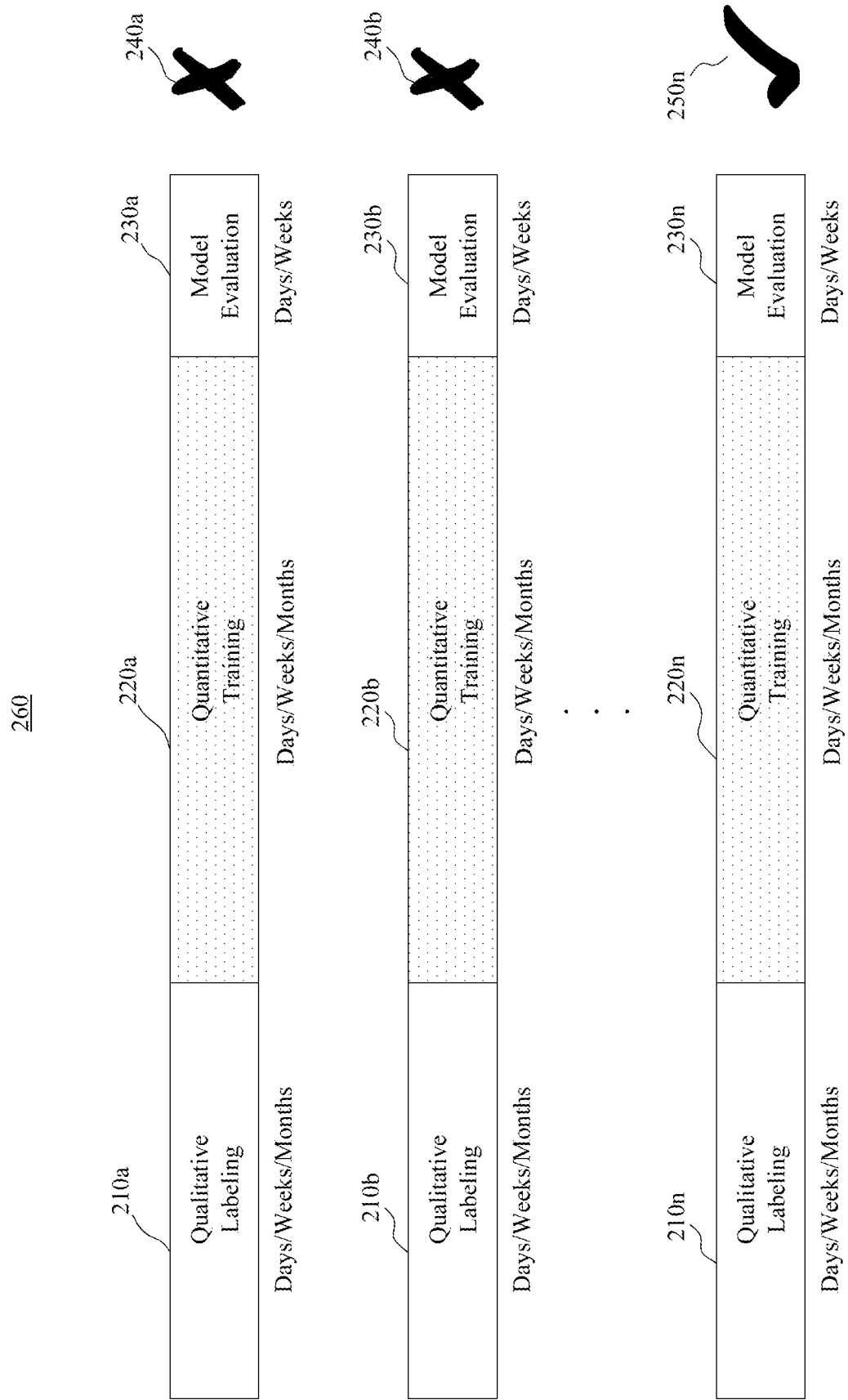
FIG. 2B shows an exemplary timeline of the conventional process of labeling, training, and evaluating an artificial neural network to generate a trained model.

Continuing, FIG. 2B shows an exemplary timeline 260 of the conventional process (200 of FIG. 2A) of iteratively labeling 210, training 220, and evaluating 230 a model of a deep learning algorithm, such as, for example, an artificial neural network (e.g., 100 of FIG. 1) to generate a trained model (250 of FIG. 2A). An inherent problem with the conventional process (200 of FIG. 2A) is that it requires a large amount of accurately labeled training data (e.g., 205 of FIG. 2A) to extensively train 220 on the model of the artificial neural network (e.g., 100 of FIG. 1) and converge on a trained model (250 of FIG. 2A), if a trained model (250 of FIG. 2A) can be generated at all. The process of qualitatively labeling 210 is one of the most time-consuming tasks in the development of trained model (250 of FIG. 2A) and is inherently prone to error. And while it has always been the case that garbage in is said to result in garbage out in the field of computer science, it is especially true in the case of labeling 210 training data (205 of FIG. 2A). A poorly labeled training dataset may not converge on a trained model (250 of FIG. 2A), requiring further iterations of labeling (e.g., 210*n*), training (e.g., 220*n*), and evaluating (e.g., 230*n*) which can add months or even years of time to the development effort.

For purposes of illustration, in a first iteration, one or more human operators may manually label 210*a*, through annotation, mark up, or identification, each aspect or feature of interest in each instance of training data (e.g., 205 of FIG. 2A) in a training dataset, in advance of training 220*a* on the labeled training dataset. In many applications, there may tens of thousands, hundreds of thousands, or even millions of individual instances of training data (e.g., 205 of FIG. 2A) that require manual labeling 210*a*. As such, the qualitative labeling 210*a* effort requires one or more human operators to individually label 210*a* each and every instance of training data (e.g., 205 of FIG. 2A) in a subjective process that may take days, weeks, or months of time to complete. An inherent problem with conventional labeling processes is that the labeling 210*a* effort is performed blind because there is no feedback as to the quality of the labeling 210*a* effort while the labeling 210*a* task is being performed.

Only after all of the training data (e.g., 205 of FIG. 2A) has been labeled 210*a*, is the labeled training dataset presented to the model of the artificial neural network (e.g., 100 of FIG. 1) for extensive training 220*a*. As previously discussed, the quantitative training 220*a* effort typically requires numerous iterations of an empirical optimization procedure, such as, for example, the stochastic gradient descent procedure, in an effort to determine the model parameters for the model of the artificial neural network (e.g., 100 of FIG. 1) based on the labeled training data. The training process 220*a* typically requires several passes through each instance of labeled training data (205 of FIG. 2A). As such, training 220*a* is computationally challenging, takes days, weeks, or months of time to complete, and is very expensive.

The inherent problem with conventional process (200 of FIG. 2A) is that training 220*a* is frustrated by improperly or poorly labeled 210*a* training data (e.g., 205 of FIG. 2A). Worse yet, there may not even be an awareness that the quality of the labeling 210*a* effort was poor until after the entire training dataset has been labeled 210*a* and the model of the artificial neural network (e.g., 100 of FIG. 1) has been extensively trained 220*a* on the labeled training dataset, over the course of days, weeks, or months of time. Only after having fully labeled 210*a* and extensively trained 220*a* may the candidate model be evaluated 230*a* for suitability in a process that itself may take further days, weeks, or months of time. As such, the process of labeling 210*a*, training 220*a*, and evaluating 230*a* may take days, weeks, or months before there is any indication that the labeling 210*a* effort of the first iteration of the conventional process (200 of FIG. 2A) failed 240*a* to produce a suitable trained model, thus requiring a second iteration of the process.

At this point, the labeling 210*a* effort of the first iteration may, for the first time, be identified as the source of the training problem (240 of FIG. 2A), therefore requiring a second iteration of the conventional process (200 of FIG. 2A). The one or more human operators must repeat the qualitative labeling 210*b* effort, revisiting the labeling 210*a* of each instance of training data (e.g., 205 of FIG. 2A) in the training dataset in yet another process that may take days, weeks, or months to complete. Only after all of the training data (e.g., 205 of FIG. 2A) in the training dataset has been labeled 210*b*, is the labeled training dataset presented to the model of the artificial neural network (e.g., 100 of FIG. 1) for extensive training 220*b*. As previously discussed, the quantitative training 220*b* is an empirical optimization procedure that typically requires several passes through the entire labeled training dataset, thus requiring additional days, weeks, or months of time to complete. Only after fully labeling 210*b* the training dataset and extensively training 220*b* on the labeled training dataset may the candidate model be evaluated 230*b* for suitability in a process that itself can take further days, weeks, or months of time. As such, from the start of the second iteration of labeling 210*b*, through the second iteration of training 220*b*, and the second iteration of model evaluation 230*b*, it may take days, weeks, or months before there is any indication that the labeling 210*b* portion of the conventional process (200 of FIG. 2A) failed 240*b* to produce a suitable trained model, thus requiring a further iteration of the process. In aggregate, the first and second iterations of the conventional process (200 of FIG. 2A) has taken a substantial amount of time, at great expense, and has not arrived at a suitably trained model, due to the poor quality of the qualitative labeling effort. To be clear, the poor quality of the labeling effort does not mean to suggest that the human operator did not make a diligent effort in performing the labeling task, instead, it means that the qualitative labeling process failed to accurately label the aspects or features of interest in the training dataset. This could be due to failing to label 210 some instances of such aspects or features or labeling data 210 where no aspects or features of interest exist, either of which can frustrate the training process 220. In addition to other penalties, each iteration may cost days, weeks, or months of development time.

Figure 3A:
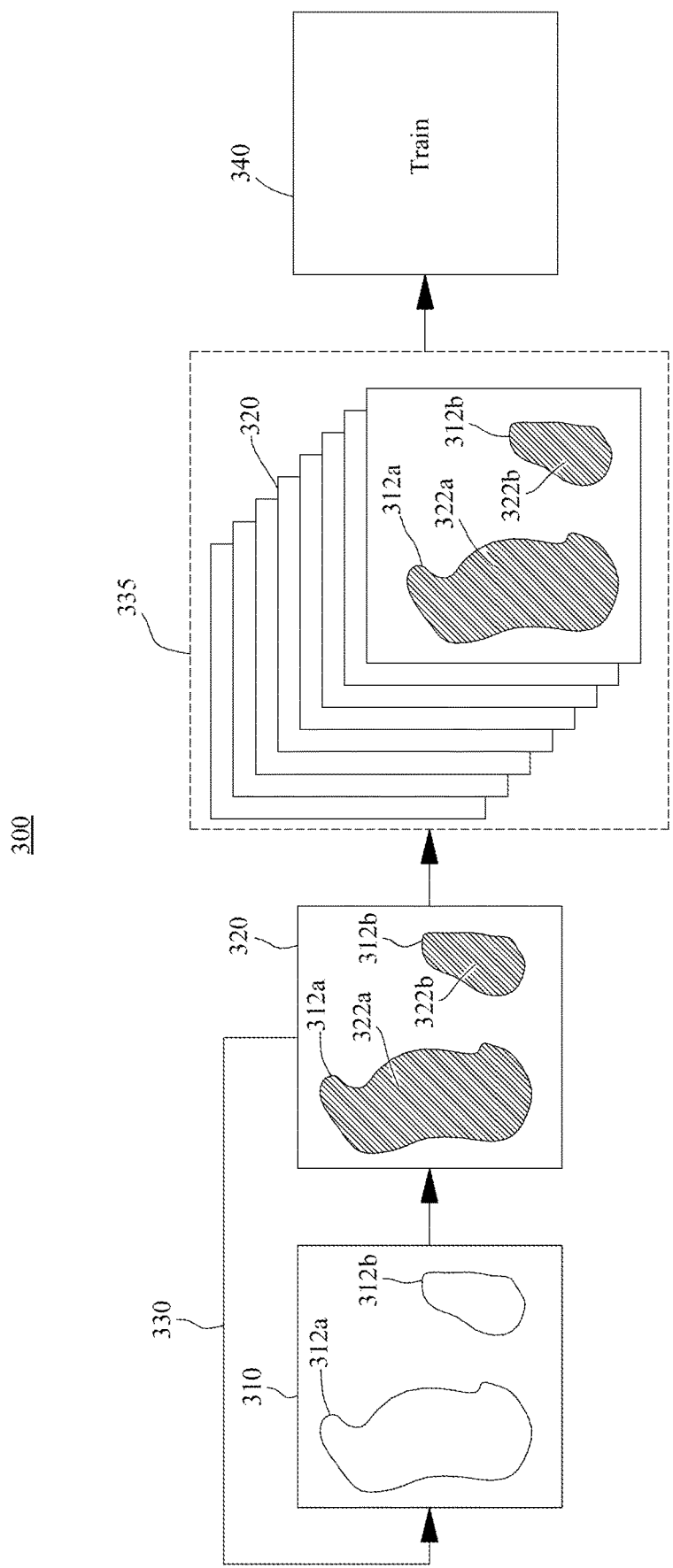
FIG. 3A shows an example of the conventional labeling process performed in advance of training a model of an artificial neural network.

FIG. 3A shows an example 300 of the conventional labeling process (200 of FIG. 2A) performed in advance of training 340 a model of a deep learning algorithm, such as, for example, an artificial neural network (e.g., 100 of FIG. 1). For this example, the training data consists of a plurality of graphical images (e.g., set of images 310) that each include one or more aspects or features (e.g., 312*a*, 312*b*) of interest. The goal of the qualitative labeling effort (e.g., 210 of FIG. 2A) is to produce a labeled training dataset 335 (e.g., set of images 320) suitable to train a model of the artificial neural network (e.g., 100 of FIG. 1) to identify, or predict, similar aspects or features of interest in new data of first impression in a manner consistent with what was learned from the labeled training dataset 335. As such, each instance of training data 310 from the training dataset (e.g., set of images 310 not shown) must be meticulously and accurately labeled (e.g., 210 of FIG. 2A) in advance of training 340 the model of the artificial neural network (e.g., 100 of FIG. 1). It is important to note that, in the conventional labeling process (e.g., 200 of FIG. 2A), the qualitative labeling effort (e.g., 310 and 320 for each 330 instance 310) is independent of the quantitative training process 340 and must be completed in advance of quantitative training 340.

Each graphical image 310, representative of a single image from a set of graphical images constituting the training dataset (e.g., set of images 310), may include one or more aspects or features 312*a*, 312*b* of interest. One of ordinary skill in the art will recognize that features 312*a*, 312*b* of interest are merely exemplary and may vary in size, shape, number, and kind. For each image 310, one or more qualitative labels 322*a*, 322*b* may be manually applied to each aspect or feature 312*a*, 312*b* of interest, producing a labeled image 320. However, it should be noted that human operators often fail to recognize every aspect or feature of interest in training data (e.g., image 310) and sometimes misidentify aspects or features as being of interest when in fact they are not of interest. Putting aside the issue of the quality of the qualitative labeling effort (e.g., 210 of FIG. 2A) for the time being, this manual and labor-intensive conventional labeling process (e.g., 210 of FIG. 2A) must be repeated for each and every image 310 in the training dataset (e.g., set of images 310), which may include tens of thousands, hundreds of thousands, or even millions of images, prior to training 340 on the labeled training dataset 335. Only after each and every image 310 in the training dataset 335 has been labeled (e.g., 210 of FIG. 2A) to identify the aspects or features 322*a*, 322*b* of interest, is the labeled training dataset 335 presented to the model of the artificial neural network (e.g., 100 of FIG. 1) for extensive training 340.

Figure 3B:
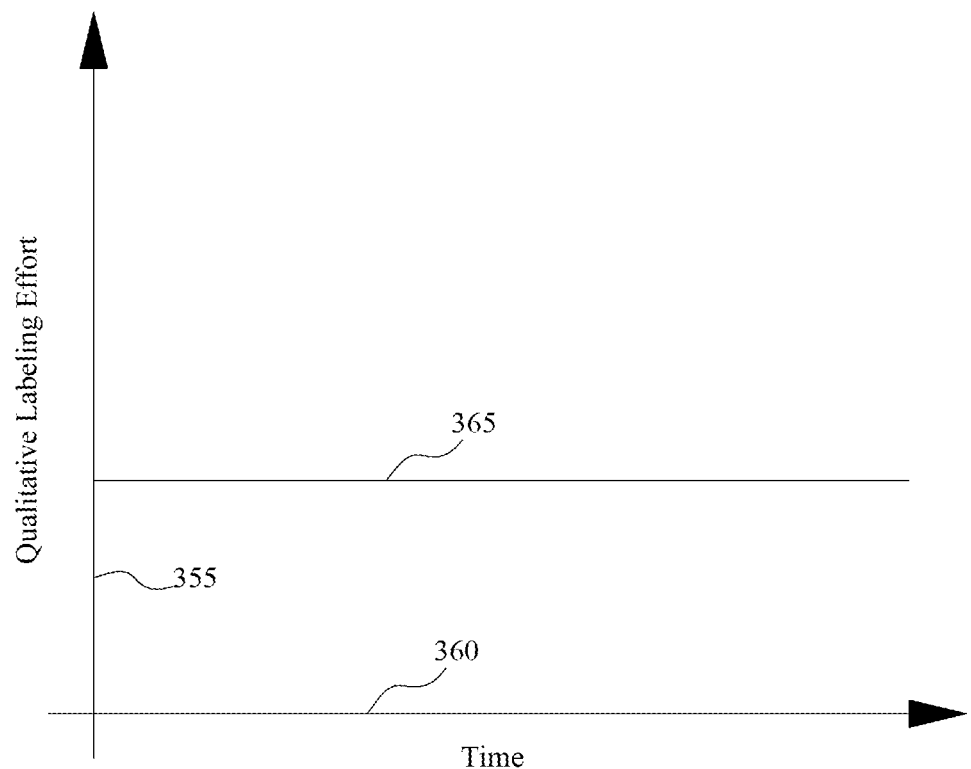
FIG. 3B shows a graph of qualitative labeling effort as a function of time for the conventional labeling process example.

Continuing, FIG. 3B shows a graph 350 of qualitative labeling effort 355 as a function of time 360 for the example (300 of FIG. 3A) of the conventional labeling process (e.g., 200 of FIG. 2A). As previously described, each graphical image (310 of FIG. 3A) from the set of images constituting the training dataset (e.g., set of images 310 of FIG. 3A) must be manually labeled (320 of FIG. 3A) in advance of, and independent of, training (340 of FIG. 3A) in a qualitative labeling process (e.g., 210 of FIG. 2A). Since each image (310 of FIG. 3A) from the set of images constituting the training dataset (e.g., set of images 310 of FIG. 3A) tend to be similar in terms of complexity, each image (310 of FIG. 3A) takes approximately the same amount of time to label and the qualitative labeling effort 355 is relatively constant 365 as a function of time 360.

For large sets of training data, this means the qualitative labeling process may take days, weeks, or even months of time to complete, the quantitative training process may take further days, weeks, or even months of time thereafter, and only then is there any feedback on the quality of the qualitative labeling process. The predictions produced by a trained model of the artificial neural network (e.g., 100 of FIG. 1) can have serious safety implications and business consequences, therefore the labeling of training data must be as accurate as possible. As such, the entire process of labeling, then training, and then evaluating may have to be repeated a number of times, potentially taking weeks, months, or even years to complete in complex applications. Despite these challenges, the conventional labeling process remains the most common way in which a training dataset is qualitatively labeled.

Figure 4A:
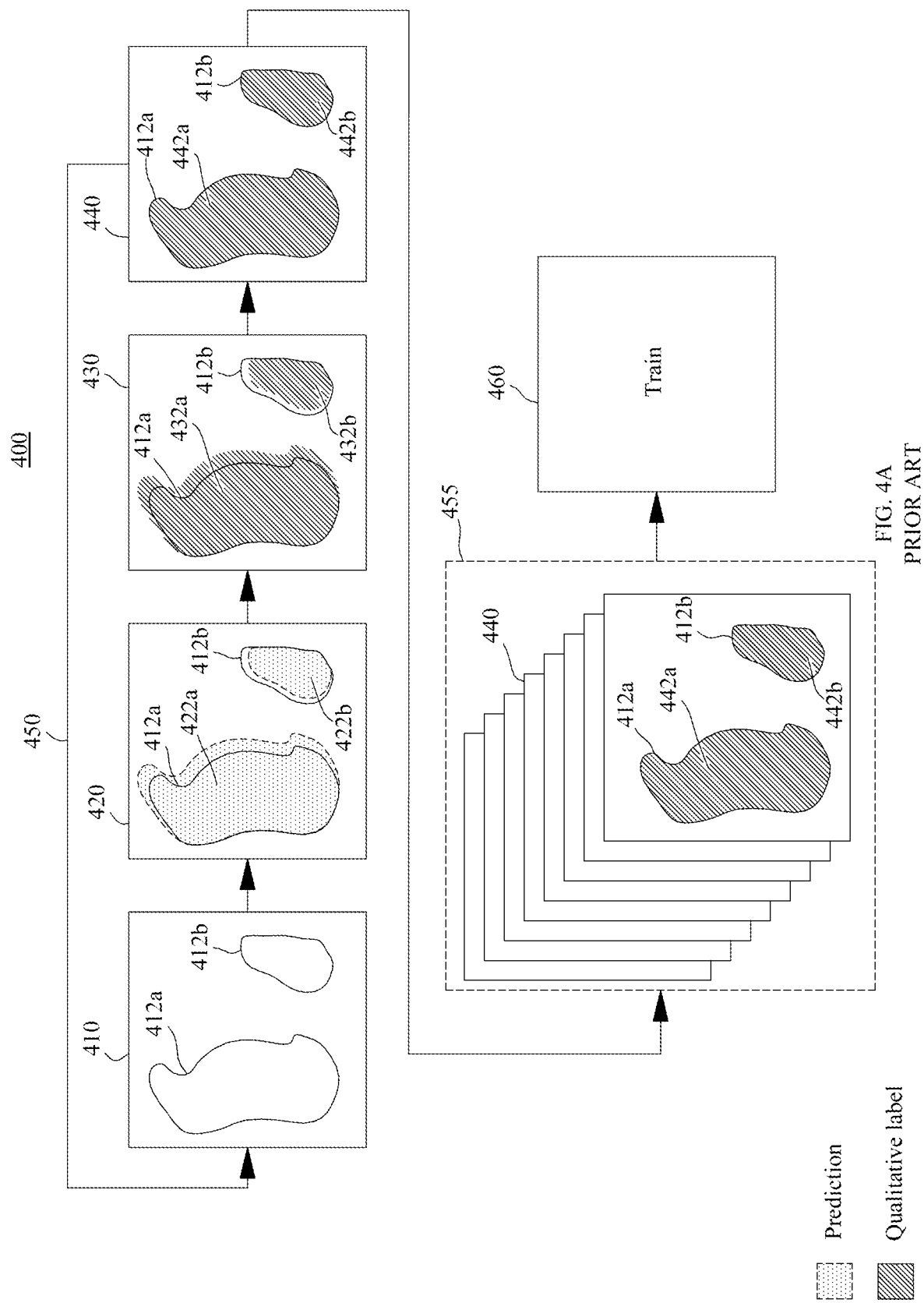
FIG. 4A shows an example of a conventional model-assisted labeling process performed in advance of training a model of an artificial neural network.

FIG. 4A shows an example 400 of the conventional model-assisted labeling process (e.g., a variation of 200 of FIG. 2A) performed in advance of training (220 of FIG. 2A) a model of a deep learning algorithm, such as, for example, an artificial neural network (e.g., 100 of FIG. 1). To address some of the issues related to conventional labeling processes (300 of FIG. 2A), model-assisted labeling attempts to alleviate some of the burden of the qualitative labeling effort. Conventional model-assisted labeling is a minor variation of the conventional labeling process (200 of FIG. 2A) where an existing model is used to generate preliminary predictions of labels. The existing model is a pre-existing model that is generated in advance without reference to the training dataset to be labeled. In keeping with the prior example, the training dataset consists of a plurality of graphical images (e.g., 410) that each include one or more aspects or features (e.g., 412*a*, 412*b*) of interest. The goal of the qualitative labeling effort (e.g., 210 of FIG. 2A) is to produce a labeled training dataset 455 (e.g., set of images 440) suitable to train 460 an intended model of an artificial neural network (e.g., 100 of FIG. 1) to identify, or predict, similar aspects or features of interest in new data of first impression in a manner consistent with what was learned from the labeled training dataset 455.

Here too, each instance of training data 410 must be meticulously and accurately labeled (e.g., 210 of FIG. 2A) in advance of training 460 the model of the artificial neural network (e.g., 100 of FIG. 1). The difference between the conventional model-assisted labeling process 400 and the conventional manual labeling process (300 of FIG. 3A) is that an existing model, independent of the intended model to be trained, of the artificial neural network (e.g., 100 of FIG. 1), is used to generate an initial prediction 420 of aspects or features of interest 422*a*, 422*b* in each instance of training data 410 that are then used as a starting place for manual labeling 432*a*, 432*b* resulting in qualitative labels 442*a*, 442*b*. It is important to note that the existing model may have no knowledge of the training dataset and may be a general-purpose model. Notwithstanding, similar to that discussed above with respect to the conventional labeling process (300 of FIG. 3A), in the conventional model-assisted labeling process 400, the qualitative labeling effort (e.g., 210 of FIG. 2A) is independent of the quantitative training process 460 and must also be completed in advance of quantitative training 460.

Each graphical image 410, representative of a single image from a set of graphical images constituting the training dataset (e.g., set of images 410), may include one or more aspects of features 412*a*, 412*b* of interest. One of ordinary skill in the art will recognize that features 412*a*, 412*b* of interest are merely exemplary and may vary in size, shape, number, and kind. For each image 410 in the set of images constituting the training dataset (e.g., set of images 410), an existing model, may be used to generate a prediction, or inference, of one or more aspects or features 422*a*, 422*b* of interest, resulting in predictively labeled image 420. The predictions 422*a*, 422*b* shown in image 420 may be preliminarily adopted as preliminary labels 432*a*, 432*b* in preliminarily labeled image 430. The human operator may manually add to, modify, or remove preliminary labels 432*a*, 432*b* resulting in qualitative labels 442*a*, 442*b*, ideally corresponding to each aspect or feature 412*a*, 412*b* of interest. It is important to note that, while the existing model produces predicted labels 422*a*, 422*b*, each image 410 in the set of images (e.g., set of images 410) constituting the training dataset (e.g., set of images 410) requires a human operator to manual modify the labels 432*a*, 432*b* to arrive at qualitative labels 442*a*, 442*b*.

As such, conventional model-assisted labeling (e.g., 400) is essentially the same as the conventional labeling process (e.g., 300 of FIG. 3A), in that it still requires human intervention to manually label each and every image 310 in the set of images constituting the training dataset (e.g., set of images 310), it may take slightly less time to label each image. Here too, it should be noted that human operators often fail to recognize every aspect or feature of interest in training data and sometimes misidentify aspects or features as being of interest when in fact they are not of interest. Putting aside the issue of the quality of the qualitative labeling effort, this manual and labor-intensive conventional model-assisted labeling process (e.g., a variation of 210 of FIG. 2A) is repeated on each and every image 410 in the training dataset (e.g., set of images 410), which may include tens of thousands, hundreds of thousands, or even millions of images, prior to training 460 on the labeled training data (e.g., set of images 440). Only after each and every image 410 in the training dataset (e.g., set of images 410) has been labeled (210 of FIG. 2A) to identify the aspects or features 442*a*, 442*b* of interest, is the set of labeled training data 455 presented to the model of the artificial neural network (e.g., 100 of FIG. 1) for extensive training 460.

Figure 4B:
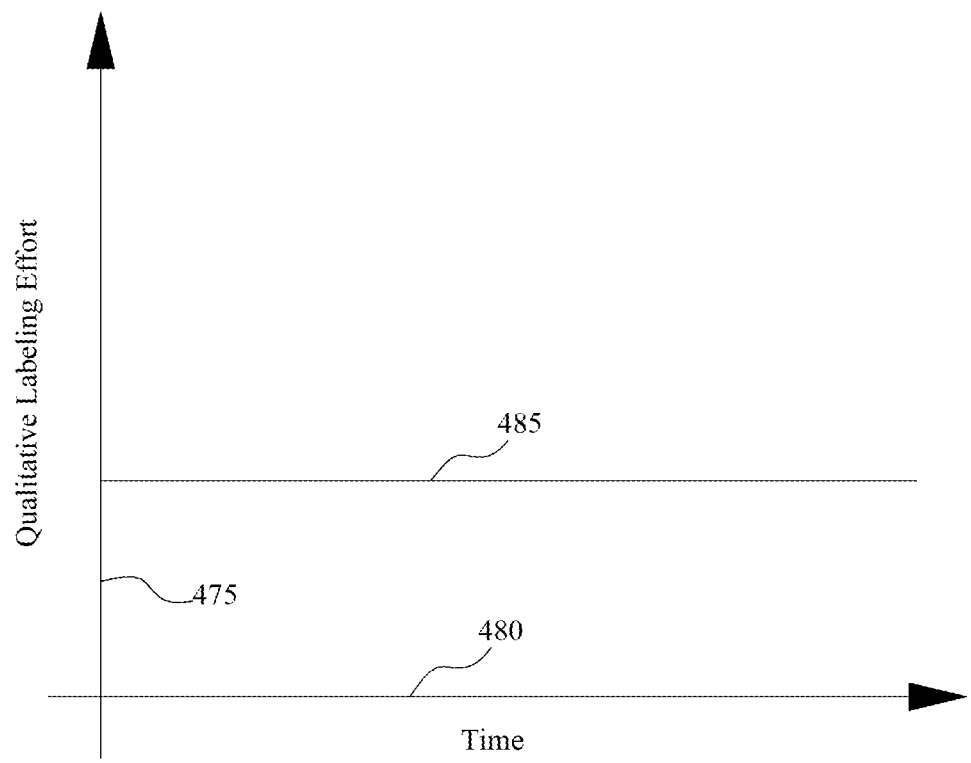
FIG. 4B shows a graph of qualitative labeling effort as a function of time for the conventional model-assisted labeling example.

Continuing, FIG. 4B shows a graph 470 of qualitative labeling effort 475 as a function of time 480 for the example (400 of FIG. 4A) of the conventional model-assisted labeling process. As previously described, each graphical image (410 of FIG. 4A) from the set of images constituting the training dataset (e.g., set of images 310 of FIG. 3A) are preliminarily labeled (420 of FIG. 4A) based on a prediction of an existing model and then must be manually re-labeled or corrected (440 of FIG. 4A) in advance of, and independent of, training (460 of FIG. 4A) in a qualitative labeling process (e.g., 210 of FIG. 2A). Since each image (410 of FIG. 4A) from the set of images constituting the training dataset (e.g., set of images 410 of FIG. 4A) tend to be similar in terms of complexity, each image (410 of FIG. 4A) takes approximately the same amount of time to label and the qualitative labeling effort 475 is relatively constant 485 as a function of time 480, but may be less than that of the conventional labeling process (300 of FIG. 3A).

For large sets of training data, this means the qualitative labeling process may take days, weeks, or even months of time to complete, the quantitative training process may take further days, weeks, or even months of time thereafter, and only then is there any feedback on the quality of the qualitative labeling process. The predictions produced by a trained model of the artificial neural network (e.g., 100 of FIG. 1) can have serious safety implications and business consequences, therefore the labeling of training data must be as complete and accurate as possible. As such, the entire process of labeling, then training, and then evaluating may have to be repeated a number of times, potentially taking weeks, months, or even years to complete in complex applications. For these reasons and others, conventional model-assisted labeling processes are typically not used in applications where there are safety implications to a trained model that performs poorly in the field.

While the example of the conventional labeling process (300 of FIG. 3A) and the example of the conventional model-assisted labeling process (400 of FIG. 4A) used a training dataset comprised of graphical images, one of ordinary skill in the art will recognize that the training dataset could be comprised of numeric data, alphanumeric data, graphical data, or variations or combinations thereof. The use of graphical images lends itself to applying qualitative labels graphically. Notwithstanding, one of ordinary skill in the art will recognize that any other type or kind of data may be qualitatively labeled in a similar manner.

At this point, it should be readily apparent that one of the greatest challenges in generating a trained model of a deep learning algorithm is the production of a labeled training dataset used to train model on. To illustrate why conventional labeling processes may take so much time and effort and may still fail to produce a suitable trained model, consider an application that attempts to train a model of an artificial neural network to perform simple math. As previously discussed, a goal of the training process is to determine correlation between qualitative labels applied to aspects or features of interest and actual aspects or features of interest (whether recognized or not). The inherent problem of conventional labeling processes is that improperly labeled training data frustrates the ability to find correlation during training.

For the purpose of illustration, assume that the labeled training dataset comprises thousands of equations, where 80 percent of the equations are labeled with correct answers and 20 percent are labeled with incorrect answers. While the model of the artificial neural network will converge on a solution with respect to the labeled training data that was labeled correctly with correct answers, the training process may be frustrated trying to find correlation for the labeled training data that was improperly labeled with incorrect answers. The training process, specifically the optimization procedures employed during training, would be frustrated trying to find correlation where no correlation exists. As previously discussed, the training process may require several passes through the entire labeled training dataset in an attempt to find correlation. This may unduly prolong the training process in each iteration of conventional labeling processes. And worse still, if the qualitative labeling effort in the next iteration fails to address all of the improperly labeled training data, further iterations of labeling and training may be required. As such, conventional labeling processes may require several iterations of labeling, training, and evaluating, taking extended periods of time, and may still fail to converge on a trained model that learned enough from the labeled training dataset to be effective. Accordingly, a significant problem in complex applications of deep learning is that low quality qualitative labeling frustrates training and requires additional iterations of labeling and training.

While conventional labeling processes are capable of producing a quality labeled training dataset, they require an extraordinary effort to qualitatively label the training dataset and a significant amount of time to qualitatively label and quantitatively train on the labeled training data in an iterative process that typically takes months and sometimes even years of time to complete development of a trained model.

Bolstered by the recent success of deep learning applications of machine learning AI, developers are motivated to undertake the development of more complex applications, most of which require an extraordinary amount of accurately labeled training data and extensive training. Since the conventional methods of labeling training data do not provide feedback as to the quality of the labeling effort while labeling, it is only after the entire training dataset has been labeled and then extensively trained on before there is any indication as to the quality of the labeling effort, typically requiring several iterations of labeling and then training before converging on a suitable trained model of a deep learning algorithm. In complex deep learning applications, the qualitative labeling portion as well as the computationally challenging quantitative training portion may take months or even years to complete.

For example, an extremely complex application of deep learning is self-driving automobiles. A self-driving automobile can drive autonomously without the input or effort of a traditional driver behind the wheel. A critical aspect of a self-driving vehicle is a trained model of an artificial neural network that inputs graphical data from various cameras to identify, in real time, roads, signs, other vehicles, pedestrians, animals, and other objects that may be encountered while driving. The model of the artificial neural network for such a complex application may have a depth, width, size, capacity, and architecture that is far more complex than that shown in artificial neural network 100 of FIG. 1A. The increased complexity of such a model of an artificial neural network requires significantly more accurately labeled training data and extensive training on that labeled training dataset in an effort to produce a trained model. And the quality of the labeled training dataset may be critical to the quality of a trained model created therefrom.

In such applications, the qualitative labeling effort may require manually labeling millions of images in a process that may take several months and potentially even years to complete. Once labeled, without any indication as to the quality of the qualitative labeling effort, the labeled training dataset is presented to the model of the artificial neural network for extensive training. As previously discussed, the training process may require several passes through each and every image in the labeled training dataset as part of the optimization procedures used to determine model parameters for the model of the artificial neural network. The quantitative training process is computationally challenging and may take several months and potentially even years to complete. As such, in this complex real-world example, it may easily take months or years to achieve just a first iteration (e.g., 210*a*, 220*a*, 230*a* of FIG. 2B) through the conventional process of labeling (e.g., 210 of FIG. 2A), training (e.g., 220 of FIG. 2A), and evaluating (e.g., 230 of FIG. 2A) the results. Only then would there be any indication about the quality of the qualitative labeling effort, and any deficiencies in the labeling effort may require additional iterations of labeling, training, and evaluating, potentially taking additional months or years to complete. Accordingly, another significant problem in complex applications of deep learning is that the complexity of the application and the complexity of the underlying artificial neural network of the model may require substantially larger training datasets that take substantially longer to qualitatively label and take substantially longer to quantitatively train on the labeled training dataset, which further imposes penalties in terms of time required to label, time required to train, and costs associated therewith.

Conventional approaches to address this problem have focused primarily on improvements to the optimization procedures used to train the model of the deep learning algorithm, improvements to the deep learning algorithm itself, or the development of new types or kinds of deep learning algorithms. However, the long felt, but unrecognized problem in the area of deep learning is that low quality qualitative labeling creates cascading penalties in terms of time required to label, time required to train, and costs associated therewith, frustrating the ability to develop suitably trained models for complex applications of deep learning. To enable more effective and complex applications, there is a long felt need for one or more methods to improve the ability to effectively qualitative label a training dataset.

Accordingly, in one or more embodiments of the present invention, a method of interactive qualitative-quantitative live labeling substantially improves the quality of qualitative labeling through near real-time feedback provided while labeling each instance of training data, substantially reduces the amount of time required to qualitatively label a training dataset, and substantially reduces the amount of time required to quantitatively train on a labeled training dataset. For each instance of training data in the training dataset to be labeled, a selected instance of training data may be submitted to a live model to generate predictions of one or more aspects or features of interest in the selected instance. The predictive labels may be converted into provisional qualitative labels that may be revised by a user to produce qualitative labels of aspects or features of interest in the selected instance. The qualitatively labeled instance of training data may then be presented to the live model to briefly train on the qualitatively labeled instance of training data and all other instances of training data designated as acceptably labeled, to update the model. This process may be repeated until the predictions of one or more aspects or features of interest are determined to be substantially the same as the actual aspects or features of interest in the selected instance of training data. The qualitatively labeled instance of training data may then be designated as acceptably labeled and the entire process may be repeated for each remaining instance of unlabeled training data in the training dataset. Because there is near real-time feedback as to the quality of the qualitative labeling effort while labeling each instance of training data, and ongoing training of the live model with acceptably labeled training data, the predictive ability of the live mode improves and the qualitative labeling effort decreases over time. Advantageously, when sufficient training data has been acceptably labeled, the qualitative labeling effort may be reduced to mere verification that the predicted labels generated by the live model are accurate and conversion of the predicted labels to qualitative labels. In complex deep learning applications, the overall qualitative labeling effort required to generate a labeled training dataset is substantially reduced, enabling rapid development and potential extension of deep learning to even more complex applications that were not feasible prior to the present invention.

Figure 5A:
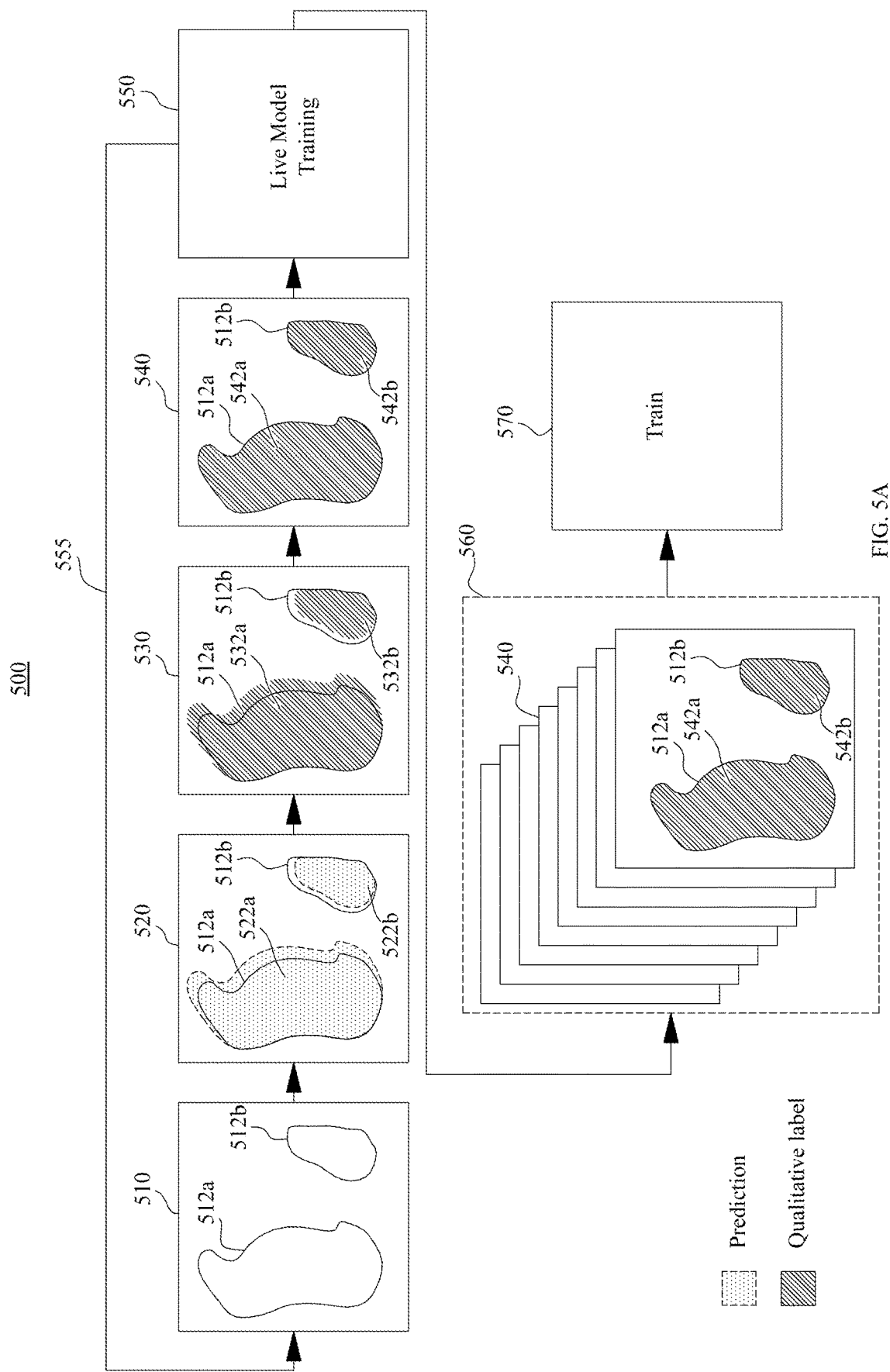
FIG. 5A shows an example of a method of interactive qualitative-quantitative live labeling in accordance with one or more embodiments of the present invention.

FIG. 5A shows an example 500 of a method of interactive qualitative-quantitative live labeling in accordance with one or more embodiments of the present invention. For the purpose of this example, an exemplary training dataset to be labeled may comprise a plurality of graphical images (e.g., set of images 510) that may each include one or more aspects or features (e.g., 512*a*, 512*b*) of interest, which may vary from instance to instance. One of ordinary skill in the art will recognize that the training dataset to be labeled may comprise numeric data, alphanumeric data, or graphical data, or combinations or variations thereof in accordance with one or more embodiments of the present invention. The goal of the qualitative labeling effort may be to produce a labeled training dataset 560 (e.g., set of acceptably labeled images 540) suitable to train 570 an intended model of a deep learning algorithm, such as, for example, an artificial neural network, to identify, or predict, similar aspects or features of interest in new data of first impression in a manner consistent with what was learned from the labeled training dataset 560. Advantageously, in one or more embodiments of the present invention, the qualitative labeling effort decreases with each instance of acceptably labeled training data used to train the 550 live model, enabling the qualitative labeling of very large training datasets required in complex deep learning applications and enabling the application of deep learning to even more complex problems.

Unlike conventional labeling processes (e.g., 200 of FIG. 2A, example 300 of FIG. 3A, and example 400 of FIG. 4A) that do not provide any feedback on the qualitative labeling effort until the entire training dataset has been labeled and then extensively trained on, one or more methods of interactive qualitative-quantitative live labeling advantageously provide near real-time feedback on the qualitative labeling effort for each instance of training data, while it is being labeled, using a live model. As the predictive ability of the live model improves, the amount of time required to qualitatively label each remaining instance of training data is significantly reduced. Put another way, the amount of time required to qualitatively label each remaining instance of training data (e.g., 510) from the training dataset (e.g., set of images 510) goes down as more instances of acceptably labeled training data (e.g., 540) are presented to the live model for training 550 and updating the model. Further, once the training dataset 560 has been acceptably labeled, the amount of time required to quantitatively train 570 a model on the qualitatively labeled training dataset 560 is also significantly reduced, because there is high correlation between actual aspects or features of interest 512*a*, 512*b* and qualitative labels 542*a*, 542*b* applied thereto.

In one or more embodiments of the present invention, the live model may comprise a deep learning algorithm, such as, for example, a deep artificial neural network. One of ordinary skill in the art will recognize that other deep learning algorithms may be used in accordance with one or more embodiments of the present invention. The live model may be put into a live training mode so that it may be used to provide near real-time feedback on the qualitative labeling effort for each instance of training data as discussed in more detail herein. The initial values for the model parameters of the live model, such as, for example, the model weight applied to each input to each node, may be zero, initialized to a predetermined value, or random. In certain embodiments, the live model may be independent of, and potentially different from, the intended model of a deep learning algorithm to be trained 570 on the labeled training dataset 560 after the method of interactive qualitative-quantitative live labeling has been performed. In such embodiments, the complexity of the live model may be less than that of the intended model to reduce the amount of time required to receive feedback from the live model while live labeling an instance of training data. For example, the depth, width, size, capacity, and complexity of the live model may be different and often less than that of the intended model. In other embodiments, the live model may be one and the same as the intended model to be trained on the labeled training dataset 560. In such embodiments, the process of training and updating the live model during interactive qualitative-quantitative live labeling may result in an updated live model suitable for use as the intended model without requiring additional training 570. In such embodiments, the intended model may be developed while qualitatively labeling, thereby saving additional time over conventional labeling and then training processes.

Returning to the example, each instance of training data 510 from the training dataset (e.g., set of images 510) may be submitted to the live model to obtain a predictively labeled instance of training data 520 in a very short amount of time. The predictively labeled instance of training data 520 may include one or more predictions of aspects or features of interest 522a, 522b, that may or may not correspond to one or more actual aspects or features of interest 512a, 512b in the instance of training data 510. The one or more predictions of features of interest 522a, 522b may be converted to provisional qualitative labels 532a, 532b to produce the provisionally labeled instance of training data 530. The provisional qualitative labels 532a, 532b may be modified or deleted by an operator and new labels (not shown) may be added resulting in qualitative labels 542a, 542b to produce a qualitatively labeled instance of training data 540. The qualitatively labeled instance of training data 540 and all other instances of training data designated as being acceptably labeled (not shown) may be presented to the live model for training 550 to update the live model.

In certain embodiments, the training process may be allowed to train for a predetermined amount of time and then stopped and the live model may then be updated with the then current state of the model parameters. In other embodiments, the training process may be allowed to train until an operator provides a directive to stop training and the live model may be updated with the then current state of the model parameters. In still other embodiments, the training process may be allowed to train until the model reaches convergence. Notwithstanding the above, experimental data has shown that extensive training is not necessary and may be limited to mere seconds or minutes to achieve the benefits described herein. The instance of training data, with qualitative labels 542a, 542b, may then resubmitted to the now updated live model to create a new version of the predictively labeled instance of training data (e.g., 520). This process of submitting an instance of training data to the live model, obtaining predictions of one or more aspects or features of interest, converting the predictions to provisional qualitative labels, and adjusting the provisional qualitative labels to arrive at a new version of the qualitatively labeled instance of training data (e.g., 540), may be repeated until the predictively labeled instance of training data (e.g., 520) accurately reflects the actual aspects or features of interest (e.g., 512a, 512b). Once the predictions of the live model are determined to be acceptable, that instance of qualitatively labeled training data 540 is designated as acceptably labeled and the live labeling process continues 555 with the next instance of training data (e.g., 510) in the training dataset. Advantageously, interactive qualitative-quantitative live labeling provides near real-time feedback as to the quality of the labeling effort for each instance of training data while it is being labeled.

Figure 5B:
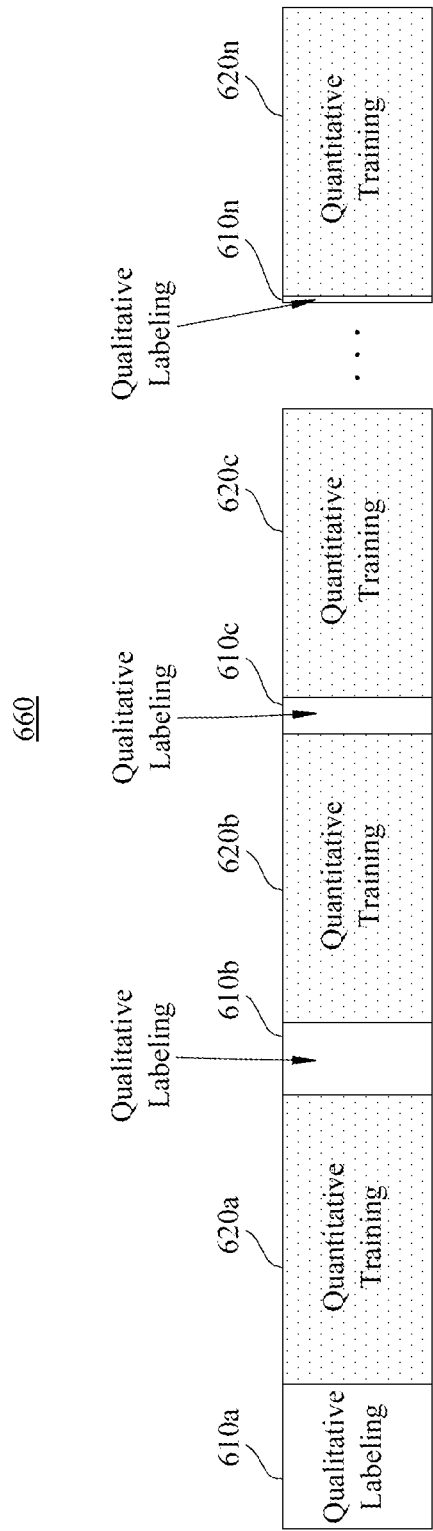
FIG. 5B shows an exemplary timeline of interactive qualitative-quantitative live labeling in accordance with one or more embodiments of the present invention.

Continuing, FIG. 5B shows an exemplary timeline 660 of interactive qualitative-quantitative live labeling in accordance with one or more embodiments of the present invention. In contrast to conventional processes that require complete labeling prior to training and the amount of time required to qualitatively label each instance of training data in the training dataset was more or less constant, one or more methods of interactive qualitative-quantitative live labeling reduces the amount of time required to qualitatively label an instance of training data because the live model gets progressively better at predicting labels with each instance of training data that is designated as acceptably labeled and is used to update the live model.

For example, a first instance of training data may be qualitatively labeled 610a as described with reference to FIG. 5A. While the first instance may take the longest amount of time, it nevertheless may be limited to mere seconds or minutes of qualitative labeling. Once the first instance is designated as being acceptably labeled, the live model is then quantitatively trained 620a on all instances of qualitatively labeled training data that are designated as acceptably labeled to update the model. A second instance of training data may then be qualitatively labeled 610b as described with reference to FIG. 5A, but typically takes less time than that of 610a because the updated live model provides better predictions during qualitative labeling 610b based on the addition of an acceptably labeled first instance of training data to the live model. Once the second instance is designated as being acceptably labeled, the live model is then quantitatively trained 620b on all instances of qualitatively labeled training data that are designated as acceptably labeled to update the model. A third instance of training data may be qualitatively labeled 610c as described with reference to FIG. 5A, but typically takes less time than that of 610a and 610b because, the live model provides better predictions during qualitative labeling 610c based on the addition of an acceptably labeled first instance of training data and an acceptably labeled second instance of training data to the live model. Once the third instance is designated as being acceptably labeled, the live model is then quantitatively trained 620c on all instances of qualitatively labeled training data that are designated as acceptably labeled to update the model. This process may continue for each unlabeled instance of training data in the training dataset. However, as more and more instances of qualitatively labeled instances of training data designated as being acceptably labeled are used to update the live model, the predictive ability of the live model improves, and the amount of time required to qualitatively label 610n instances of training data decreases until it becomes mere verification that the predictions of the live model are acceptable, which may then be converted to qualitative labels and designated as acceptably labeled.

Figure 5C:
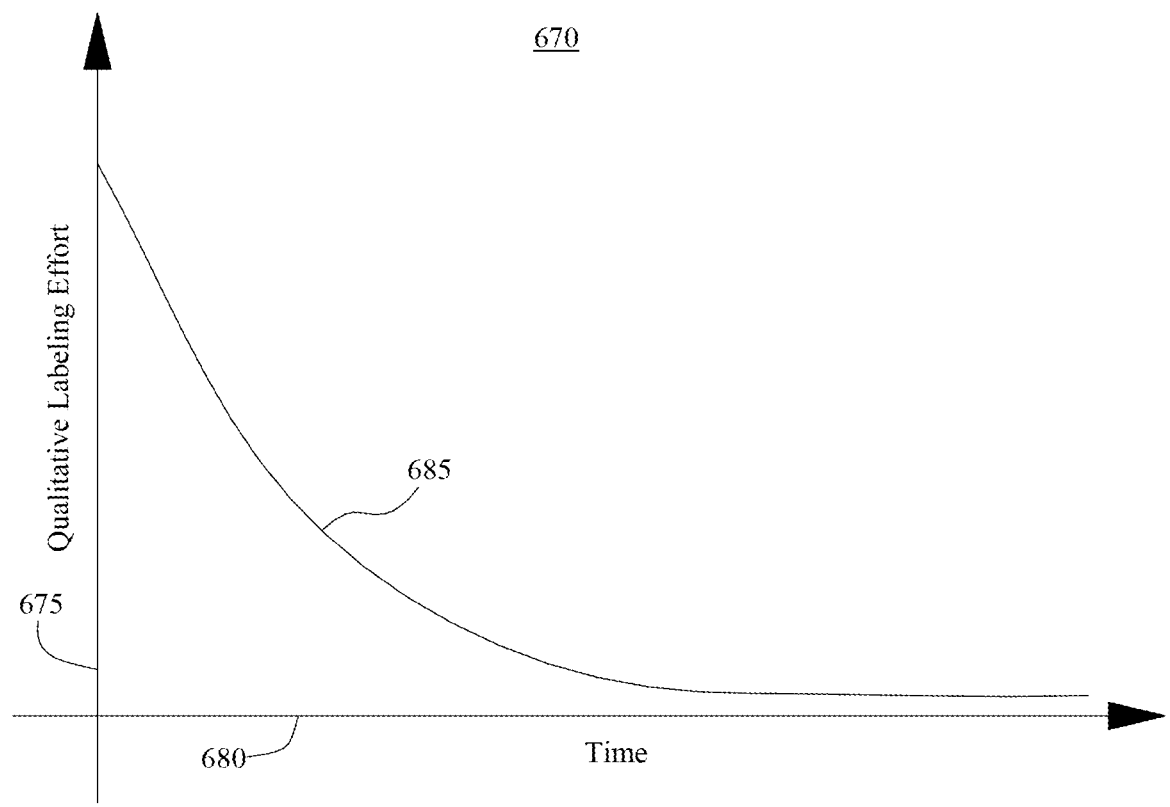
FIG. 5C shows a graph of qualitative labeling effort as a function of time for the interactive qualitative-quantitative live labeling example in accordance with one or more embodiments of the present invention.

Continuing, FIG. 5C shows a graph 670 of qualitative labeling effort 675 as a function of time 680 for the interactive qualitative-quantitative live labeling example in accordance with one or more embodiments of the present invention. In contrast to conventional processes that require complete labeling prior to training and the qualitative labeling effort is relatively constant as a function of time (e.g., 350 of FIG. 3B and 470 of FIG. 4B), one or more methods of interactive qualitative-quantitative live labeling substantially reduces the amount of time required to qualitatively label each successive instance of training data as more instances of training data are designated as acceptably labeled and are used to update the live model. In effect, the qualitative labeling effort is only required until the live model learns how to accurately predict one or more aspects or features of interest in subsequent instances of training data. The number of instances of training data required may vary based on the depth, width, size, capacity, and complexity of the live model and the type or kind of training dataset being labeled. Notwithstanding, in certain embodiments, the number of instances of training data required to accurately predict one or more aspects or features of interest may be less than 10% of total number of instances of training data in the training dataset. In other embodiments, the number of instances of training data required to accurately predict one or more aspects or features of interest may be less than 25% of total number of instances of training data in the training dataset. In still other embodiments, the number of instances of training data required to accurately predict one or more aspects or features of interest may be less than 50% of total number of instances of training data in the training dataset. In complex applications of deep learning, where the training dataset may comprise millions of instances of training data, the advantage of interactive qualitative-quantitative live labeling is readily apparent because, the vast majority of the instances of training data are effectively qualitatively labeled by the live model. This results in a substantial reduction in the amount of time required to qualitatively label a training dataset and the high quality of the qualitative labels also reduces the amount of time required to train an intended model of a deep learning algorithm, that may be substantially more complex than the live model, on the labeled training data due to high correlation between qualitative labels applied and actual aspects or features of interest.

Figure 6A:
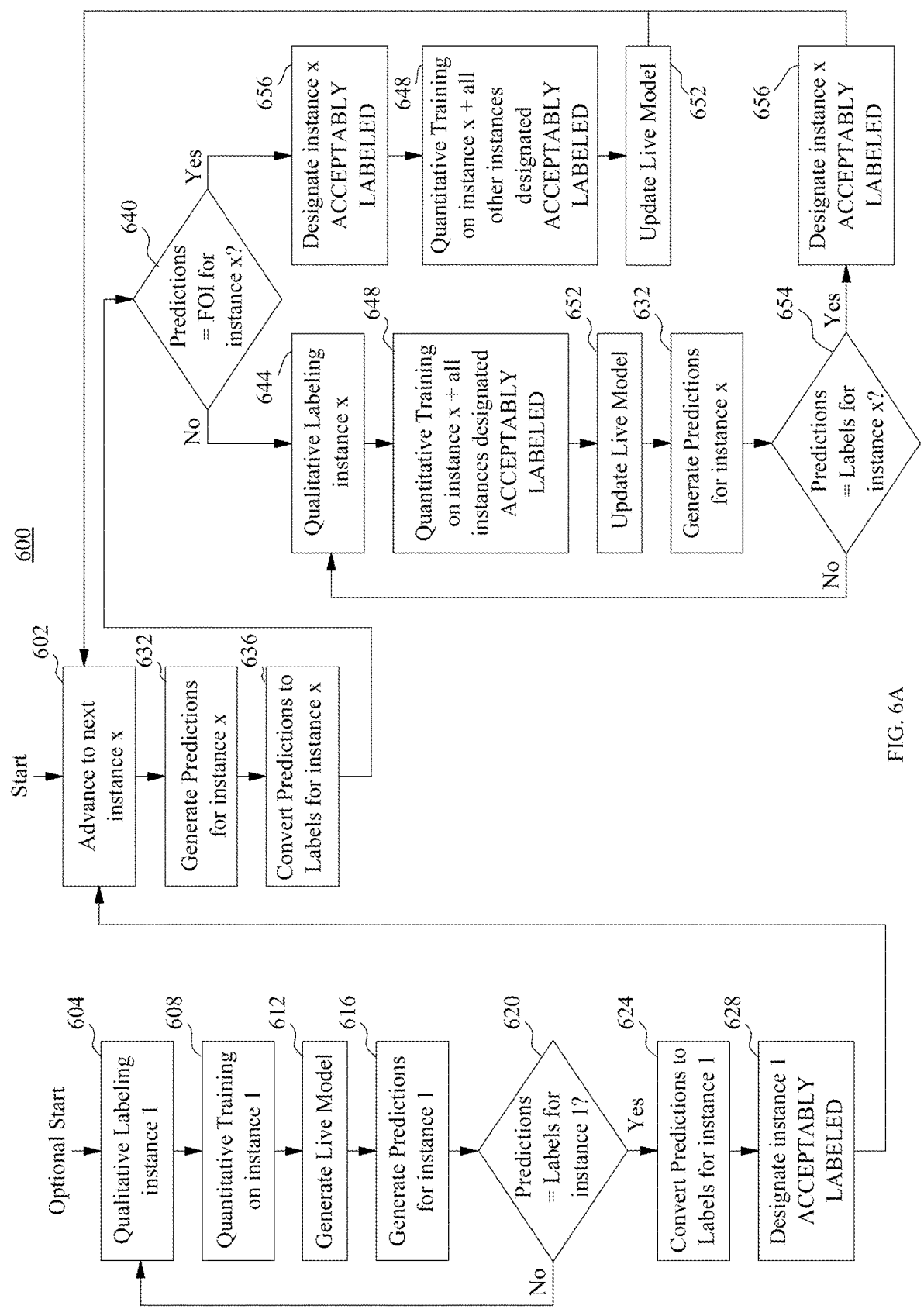
FIG. 6A shows a method of interactive qualitative-quantitative live labeling to generate a labeled training dataset in accordance with one or more embodiments of the present invention.

FIG. 6A shows a method 600 of interactive qualitative-quantitative live labeling a training dataset to generate a labeled training dataset in accordance with one or more embodiments of the present invention. One or more methods disclosed herein may be used to generate a labeled training dataset that may be used to train an intended model of a deep learning algorithm for operative use.

In one or more embodiments of the present invention, a live model may be used to provide near real-time feedback on the quality of the qualitative labeling effort for each instance of training data, while the qualitative labeling task is being performed. For the purpose of this disclosure, a live model is a parameterized deep learning algorithm that may be stopped during training, without necessarily reaching convergence, and the model parameters of the live model reflect the then current state of model parameters at the time the training was stopped. The live model may have a depth, width, size, capacity, and complexity that is different from, and usually less than that of, an intended model of a deep learning algorithm to be trained with the labeled training dataset, to expedite the operation of the live model as part of one or more methods of interactive qualitative-quantitative live labeling. However, as discussed in more detail herein, in certain embodiments, the live model itself may serve as the intended model in certain applications or designs. In certain embodiments, the live model may comprise a parameterized artificial neural network. In other embodiments, the live model may comprise a parameterized convolutional neural network. In still other embodiments, the live model may comprise a parameterized recurrent neural network. In still other embodiments, the live model may comprise a parameterized radial basis function network, long short-term memory network, self-organizing map, autoencoder, deep belief network, or other deep learning algorithm.

In certain embodiments, an initial parameterized version of a live model may be generated using a deep learning algorithm, where the model parameters may be initialized to zero, predetermined values, or random values. In other embodiments, an existing parameterized version of a live model may be used, where the model parameters may be set to values based on prior use of the live model. In still other embodiments, a first instance of training data may be used to generate an initial parameterized version of a live model (see Optional Start of FIG. 6A). The process may include, repetitively: qualitatively labeling 604 one or more features of interest in a first instance of training data by applying one or more initial qualitative labels to the instance of training data, quantitatively training 608 the live model on the qualitatively labeled first instance of training data to generate a live model 612 or update an existing live model, generating 616 one or more predictions of features of interest in the first instance of training data, and comparing 620 the one or more predictions of features of interest in the first instance of training data to the one or more qualitative labels applied to the first instance of training data, until the one or more predictions of features of interest in the first instance of training data are substantially the same as the one or more qualitative labels applied to the first instance of training data. Once the predictions are substantially the same as the qualitative labels, the one or more predictions may be converted 624 to qualitative labels, the first instance of training data may be designated 628 as being acceptably labeled, and the process may advance to the next instance of training data to be qualitatively labeled 602.

In certain embodiments, the comparison 620 of the one or more predictions of features of interest in the first instance of training data to the one or more qualitative labels applied to the first instance of training data may be based on a qualitative comparison performed by an operator. In such embodiments, a computer-implemented method of interactive qualitative-quantitative live labeling or a non-transitory computer-readable medium that comprises software instructions that perform a method of interactive qualitative-quantitative live labeling, the method may include receiving, from an operator, a determination as to whether the one or more predictions of features of interest in the instance of training data are substantially the same as the one or more qualitative labels applied to the instance of training data. In other embodiments, the comparison 620 of the one or more predictions of features of interest in the first instance of training data to the one or more qualitative labels applied to the first instance of training data may be based on a quantitative comparison performed by software, such as, a diff function of predictions to qualitative labels. In such embodiments, a tolerance, whether predetermined or specified by an operator, may be used to determine the extent to which the predictions may deviate from the qualitative labels and still determine that the predictions are substantially the same as the qualitative labels. In still other embodiments, the comparison 620 of the one or more predictions of features of interest in the first instance of training data to the one or more qualitative labels applied to the first instance of training data may be based on quantitative-qualitative comparison, where software, such as a diff function, provides a quantitative comparison of predictions to qualitative labels and an operator makes a qualitative decision as to whether the predictions are substantially the same as the qualitative labels. One of ordinary skill in the art will recognize that the comparison 620 may be performed by an operator, automatically performed by software, or performed by an operator with the assistance of software that provides quantitative feedback as to the tolerance and may vary based on application or design in accordance with one or more embodiments of the present invention.

While the optional start described above may be used to generate a live model based on a first instance of qualitatively labeled training data, as previously discussed, in one or more embodiments of the present invention, an initial parameterized version of a live model may be generated using a deep learning algorithm, where the model parameters may be initialized to zero, predetermined values, or random values or an existing parameterized version of a live model may be used, where the model parameters may be set to values based on prior use of the live model. In such cases, the method may start with advancing 602 to an instance of training data and proceeding as follows.

In one or more embodiments of the present invention, a method of interactively live labeling a training dataset may include, for each instance of training data in the training dataset to be labeled 602: generating 632 one or more predictions of features of interest in an instance of training data with a live model of a deep learning algorithm, converting 636 the one or more predictions of features of interest in the instance of training data to one or more provisional qualitative labels applied to the instance of training data, and determining 640 whether the one or more predictions of features of interest in the instance of training data are substantially the same as one or more features of interest in the instance of training data. One of ordinary skill in the art, having the benefit of this disclosure, will recognize that the conversion 636 of the one or more predictions to one or more provisional qualitative labels may be performed before (as shown) or after the determination 640 is made in accordance with one or more embodiments of the present invention.

In certain embodiments, the determination of whether the one or more predictions of features of interest in the instance of training data are substantially the same as the one or more features of interest in the instance of training data may be based on a qualitative comparison performed by an operator. In such embodiments, a computer-implemented method of interactive qualitative-quantitative live labeling or a non-transitory computer-readable medium that comprises software instructions that perform a method of interactive qualitative-quantitative live labeling may include receiving, from an operator, a determination as to whether the one or more predictions of features of interest in the instance of training data are substantially the same as one or more features of interest in the instance of training data based on a qualitative assessment performed by the operator.

If 640 the one or more predictions of features of interest in the instance of training data is substantially the same as the one or more features of interest in the instance of training data the method may include: designating 656 the instance of training data as acceptably labeled, quantitatively training 648 the live model on the instance of training data and all other instances of training data designated as acceptably labeled to update 652 the live model, and then advancing to the next instance 602 of training data for live labeling.

If 640 the one or more predictions of features of interest in the instance of training data are not substantially the same as the one or more features of interest in the instance of training data, the method may include, repetitively: qualitatively labeling 644 one or more features of interest in the instance of training data by applying or modifying one or more qualitative labels to the instance of training data, qualitatively training 648 the live model on the qualitatively labeled instance of training data and all other instances of training data designated as acceptably labeled to update 652 the live model, generating 632 one or more predictions of features of interest in the instance of training data with the updated live model, and comparing 654 the one or more predictions of features of interest in the instance of training data to the one or more qualitative labels applied to the instance of training data, until the one or more predictions of features of interest in the instance of training data are substantially the same as the one or more qualitative labels applied to the instance of training data, then designating 656 the instance of training data as acceptably labeled, and advancing to the next instance 602 of training data for live labeling. In one or more embodiments of the present invention, a computer-implemented method of interactive qualitative-quantitative live labeling or a non-transitory computer-readable medium that comprises software instructions that perform a method of interactive qualitative-quantitative live labeling, qualitatively labeling 644 may comprise receiving, from an operator, one or more qualitative labels applied to one or more features of interest in the instance of training data.

In certain embodiments, comparing 654 the one or more predictions of features of interest in the instance of training data to the one or more qualitative labels applied to the instance of training data may be based on a qualitative comparison performed by an operator. In such embodiments, a computer-implemented method of interactive qualitative-quantitative live labeling or a non-transitory computer-readable medium that comprises software instructions that perform a method of interactive qualitative-quantitative live labeling may include receiving, from an operator, a determination as to whether the one or more predictions of features of interest in the instance of training data are substantially the same as the one or more qualitative labels applied to the instance of training data. In other embodiments, comparing 654 the one or more predictions of features of interest in the instance of training data to the one or more qualitative labels applied to the instance of training data may be based on a quantitative comparison performed by software, such as, a diff function of predictions to qualitative labels. In such embodiments, a tolerance, whether predetermined or specified by an operator, may be used to determine the extent to which the predictions may deviate from the qualitative labels and still determine that the predictions are substantially the same as the qualitative labels. In still other embodiments, comparing 654 the one or more predictions of features of interest in the instance of training data to the one or more qualitative labels applied to the instance of training data may be based on quantitative-qualitative comparison, where software, such as a diff function, provides a quantitative comparison of predictions to qualitative labels and an operator makes a qualitative decision as to whether the predictions are substantially the same as the qualitative labels. One of ordinary skill in the art will recognize that the comparison 654 may be performed by an operator, automatically performed by software, or performed by an operator with the assistance of software that provides quantitative feedback as to the tolerance and may vary based on application or design in accordance with one or more embodiments of the present invention.

Advantageously, the amount of time required to qualitatively label 644 each instance of training data in the training dataset decreases over time as additional instances of training data are designated as acceptably labeled and used to update 652 the live model and the live model improves in its predictive labeling.

Continuing, FIG. 6B shows training 676 an intended model of a deep learning algorithm on labeled training dataset 668 in accordance with one or more embodiments of the present invention.

In one or more embodiments of the present invention, an intended model of a deep learning algorithm may be trained 676 on the labeled training dataset 668 to generate a trained model for operative use. The trained model may comprise a parameterized deep learning algorithm. In certain embodiments, the trained model may comprise a parameterized artificial neural network. In other embodiments, the trained model may comprise a parameterized convolutional neural network. In still other embodiments, the trained model may comprise a parameterized recurrent neural network. In still other embodiments, the trained model may comprise a parameterized radial basis function network, long short-term memory network, self-organizing map, autoencoder, deep belief network, or other deep learning algorithm.

The labeled training dataset 668 may comprise all instances of training data 672 designated as acceptably labeled by one or more methods of interactive quantitative-qualitative live labeling. In certain embodiments, the training dataset and the labeled training dataset 668 may comprise tens of thousands of instances of training data. In other embodiments, the training dataset and the labeled training dataset 668 may comprise hundreds of thousands of instances of training data. In still other embodiments, the training dataset and the labeled training dataset 668 may comprise millions of instances of training data. One of ordinary skill in the art will recognize that the size of the training dataset and labeled training dataset 668 may vary based on the complexity of the underlying deep learning algorithm and the application in accordance with one or more embodiments of the present invention.

In certain embodiments, the training dataset and labeled training dataset 668 may comprise numeric data. In other embodiments, the training dataset and labeled training dataset 668 may comprise alphanumeric data. In still other embodiments, the training dataset and labeled training dataset 668 may comprise graphical data. One of ordinary skill in the art will recognize that the training dataset and labeled training dataset 668 may comprise any type or kind of data, or combination or variation thereof, in accordance with one or more embodiments of the present invention.

One of ordinary skill in the art will recognize that at least part of one or more methods of interactive qualitative-quantitative live labeling a training dataset may be performed by a computer (e.g., 800 of FIG. 8) as a computer-implemented method in accordance with one or more embodiments of the present invention. Additionally, one or ordinary skill in the art will also recognize that one or more non-transitory computer-readable media (e.g., 850 and 860 of FIG. 8) may comprise software instructions that, when executed by a processor, may perform at least part of one or more methods of interactive qualitative-quantitative live labeling a training dataset in accordance with one or more embodiments of the present invention.

Figure 7A:
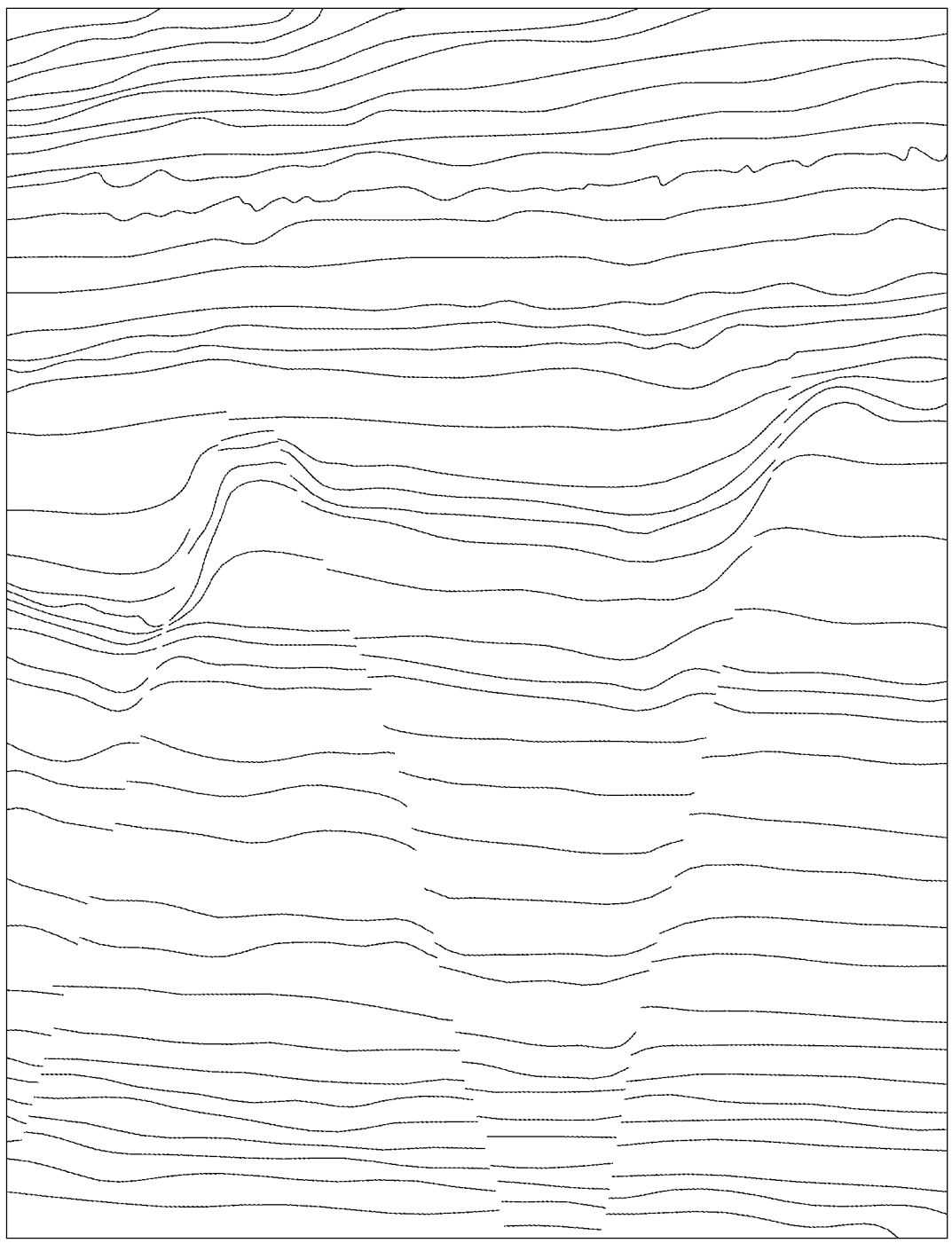
FIG. 7A shows an exemplary unlabeled image to be labeled with a method of interactive qualitative-quantitative live labeling in accordance with one or more embodiments of the present invention.

FIG. 7A shows an exemplary unlabeled image 700a to be labeled with a method of interactive qualitative-quantitative live labeling in accordance with one or more embodiments of the present invention. As previously discussed, one or more methods of interactive qualitative-quantitative live labeling may be used in any application of deep learning artificial intelligence that uses data of any type or kind, including numeric data, alphanumeric data, or graphical data, or combinations or variations thereof. As such, the following example is not intended to limit the type or kinds of applications, but merely to provide an illustrative example of how one or more methods may be employed.

In certain embodiments, a training dataset may comprise a plurality of graphical images (e.g., 700a), each of which may comprise one or more features of interest that we wish to train a model of a deep learning algorithm to identify. For the purposes of this example, exemplary unlabeled image 700a may comprise a seismic image of the earth below the ocean floor in which we wish to identify one or more faults in the earth (vis-à-vis the features of interest in this example), in a process that is conventionally referred to as fault imaging. In this example, a fault may be any surface, or narrow zone, with visible shear displacement along the zone. The identification of such faults is important in petroleum exploration because faults may behave as a seal or a conduit for hydrocarbon transport to a trap. If the fault trap has a large enough volume to store oil and gas, it may be economically viable to drill and produce. Conventionally, geoscientists visually interpret seismic data, looking for significant displacement in a set of seismic reflectors. However, the ability of the human eye to discern such features is prone to error. Further, the amount of time required to visually interpret each seismic image in a survey can be exceptionally time consuming and expensive. Here, for the purpose of this example, the goal is to label a training dataset comprised of a plurality of unlabeled seismic images to produce a labeled training dataset that may be used to train an intended model of a deep learning algorithm to produce a trained model, where the trained model can then be used to accurately predict faults in seismic images of first impression, automatically, with little to no human intervention. As shown in unlabeled image 700a, there are several locations where there visually appears to be heave in the horizontal axis and throw in the vertical axis, representing fault displacement (and other areas that may be less discernable to the human eye).

Figure 7B:
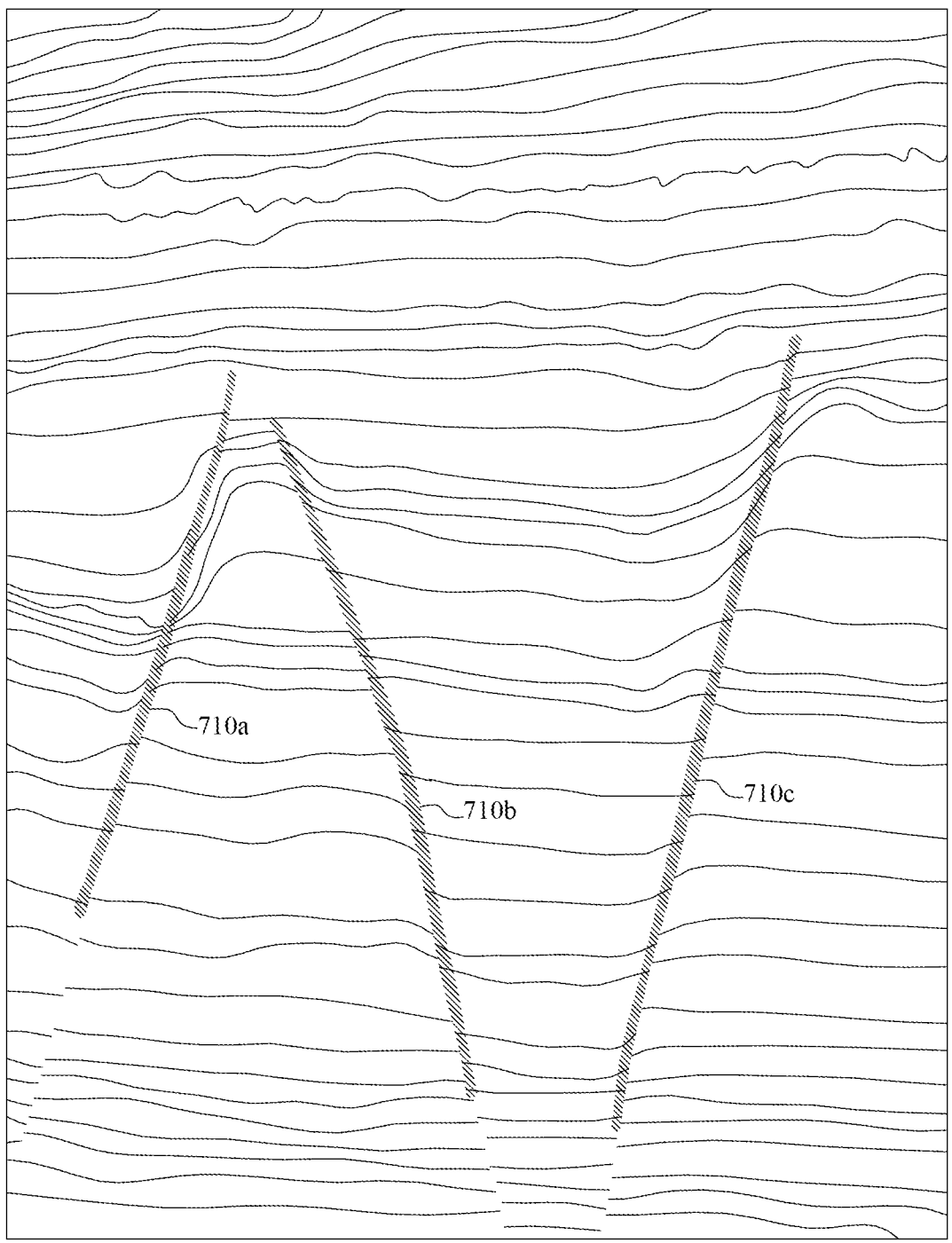
FIG. 7B shows exemplary predictive labeling of the image with a method of interactive qualitative-quantitative live labeling in accordance with one or more embodiments of the present invention.

Continuing, FIG. 7B shows exemplary predictive labeling of the image 700b with a method of interactive qualitative-quantitative live labeling in accordance with one or more embodiments of the present invention. The unlabeled image (e.g., 700a of FIG. 7A) may be submitted to a live model to generate one or more predictions of features of interest (e.g., faults) in the image. The live model may produce the predictively labeled image 700b, where the live model applies predictive labels 710a, 710b, 710c to one or more features of interest that the live model could then identify. An operator may then review the predictive labels 710a, 710b, 710c and make a determination as to whether they are substantially the same as the actual aspects or features of interest in the image 700b.

Figure 7C:
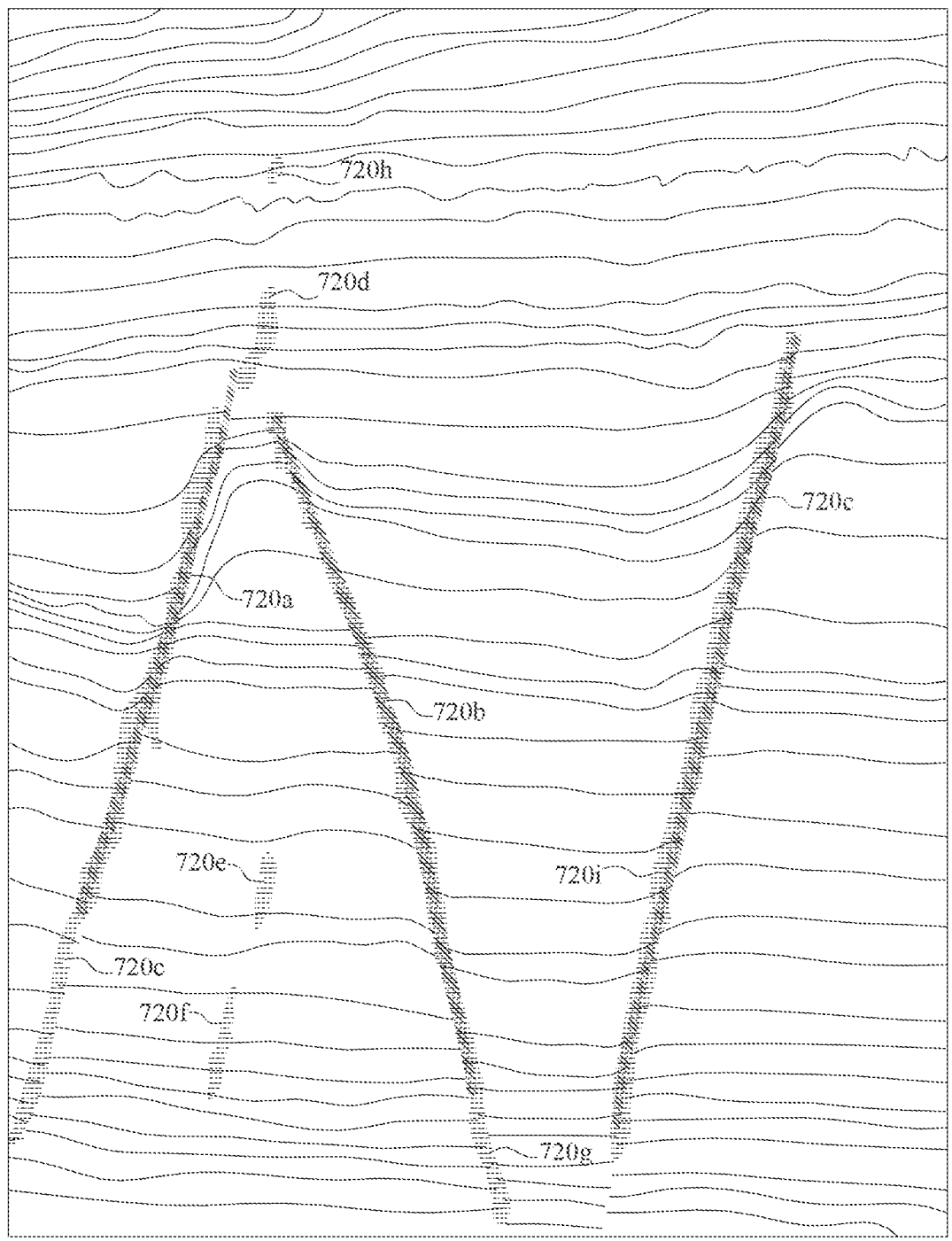
FIG. 7C shows exemplary qualitative labeling of the image with a method of interactive qualitative-quantitative live labeling in accordance with one or more embodiments of the present invention.

Continuing, FIG. 7C shows exemplary qualitative labeling of the image 700c with a method of interactive qualitative-quantitative live labeling in accordance with one or more embodiments of the present invention. If the predictive labels (710a, 710b, 710c of FIG. 7B) are not substantially the same as the actual features of interest in the image, the predictive labels (710a, 710b, 710c of FIG. 7B) may be converted into qualitative labels 720a, 720b, 720c and the operator may modify, delete, or add additional qualitative labels 720d, 720e, 720f, 720g, 720h, 720i, and 720j to the image 700c. Qualitatively labeled image 700c may be presented to the live model to quantitatively train on image 700c and all other images designated as being acceptably labeled to update the live model.

Figure 7D:
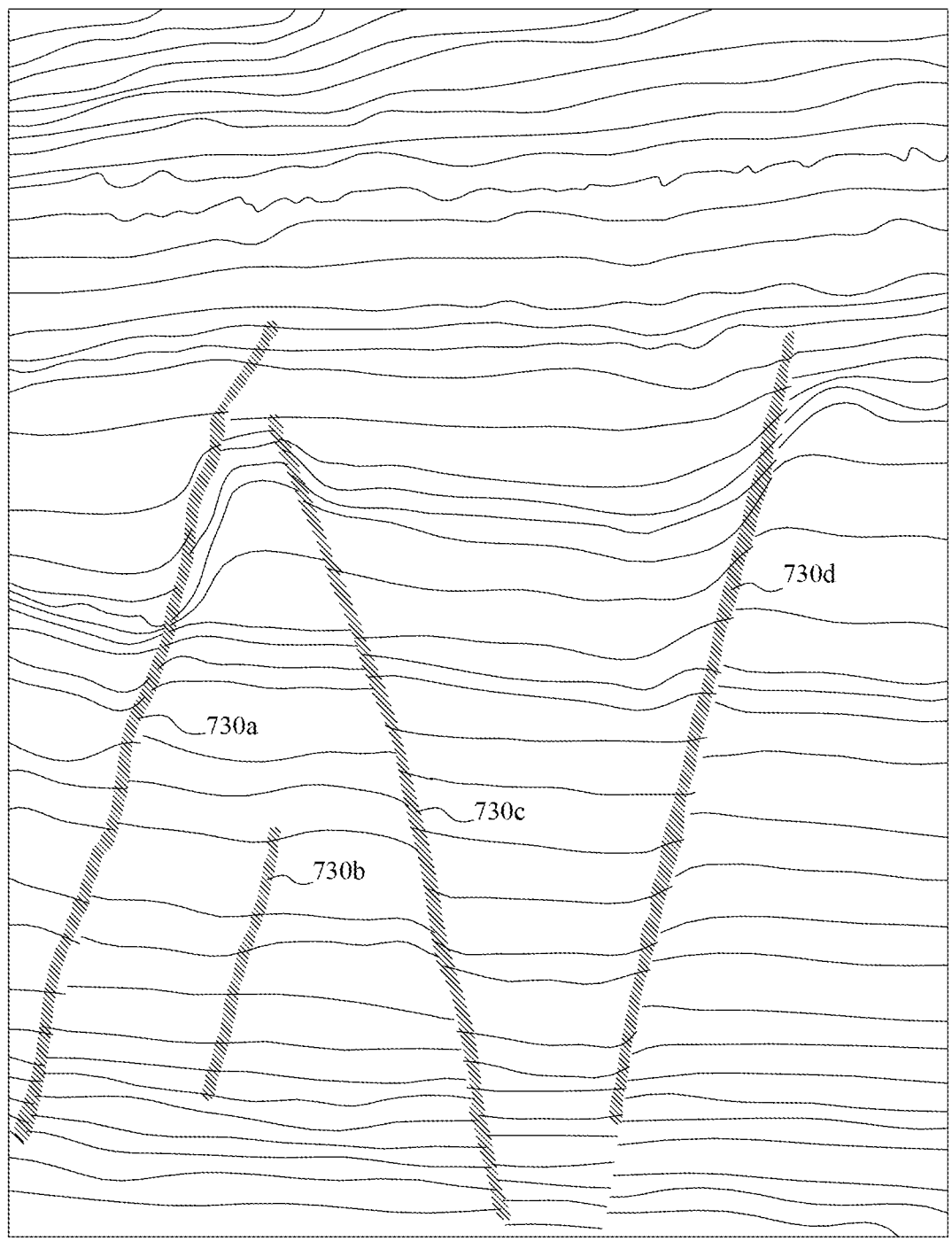
FIG. 7D shows exemplary predictive labeling of the image with a method of interactive qualitative-quantitative live labeling in accordance with one or more embodiments of the present invention.

Continuing, FIG. 7D shows exemplary predictive labeling of the image 700d with a method of interactive qualitative-quantitative live labeling in accordance with one or more embodiments of the present invention. The qualitatively labeled image (e.g., 700c of FIG. 7C) may be resubmitted to the live model to generate one or more predictions of features of interest (e.g., faults) in the image. The live model may produce the predictively labeled image 700d, where the live model applies predictive labels 730a, 730b, 730c, and 730d to one or more features that the live model can now identify. An operator may then compare the predictive labels 730a, 730b, 730c, and 730d to the qualitative labels (e.g., 720 of FIG. 7C) and make a determination as to whether they are substantially the same as the actual aspects or features of interest in the image 700d.

If the one or more predictions of features of interest 730a, 730b, 730c, and 730d in image 700d are substantially the same as the one or more features of interest in the image (e.g., 700a of FIG. 7A), the predictive labels 730a, 730b, 730c, and 730d may be converted into qualitative labels 730a, 730b, 730c, and 730d, and image 700d may be designated as being acceptably labeled. The live model may be quantitatively trained on all images designated as acceptably labeled to update the live model. The method may then proceed to the next image in the training dataset.

If the one or more predictions of features of interest 730a, 730b, 730c, and 730d in image 700d are not substantially the same as the one or more features of interest in the image (e.g., 700a of FIG. 7A), the method may continue by repetitively: converting the one or more predictions of features of interest in image (e.g., 700d) into one or more provisional qualitative labels applied to image (e.g., 700d), qualitatively labeling (e.g., 720) one or more features of interest in the image by applying one or more qualitative labels (e.g., 720), qualitatively training the live model on the qualitatively labeled image and all previous images designated as acceptably labeled to update the live model, generating one or more predictions of features of interest (e.g., 710) in the image with the live model, and comparing the one or more predictions of features of interest (e.g., 710) in the image to the one or more qualitative labels (e.g., 720) applied to the image, until the one or more predictions of features of interest in the image are substantially the same as the one or more qualitative labels applied to the image and then designating the image as acceptably labeled.

The same process may be applied to each image in the training dataset until a complete labeled training dataset is produced, which may then be used to train an intended model of a deep learning algorithm on the labeled training dataset to produce a trained model for operative use.

Figure 8:
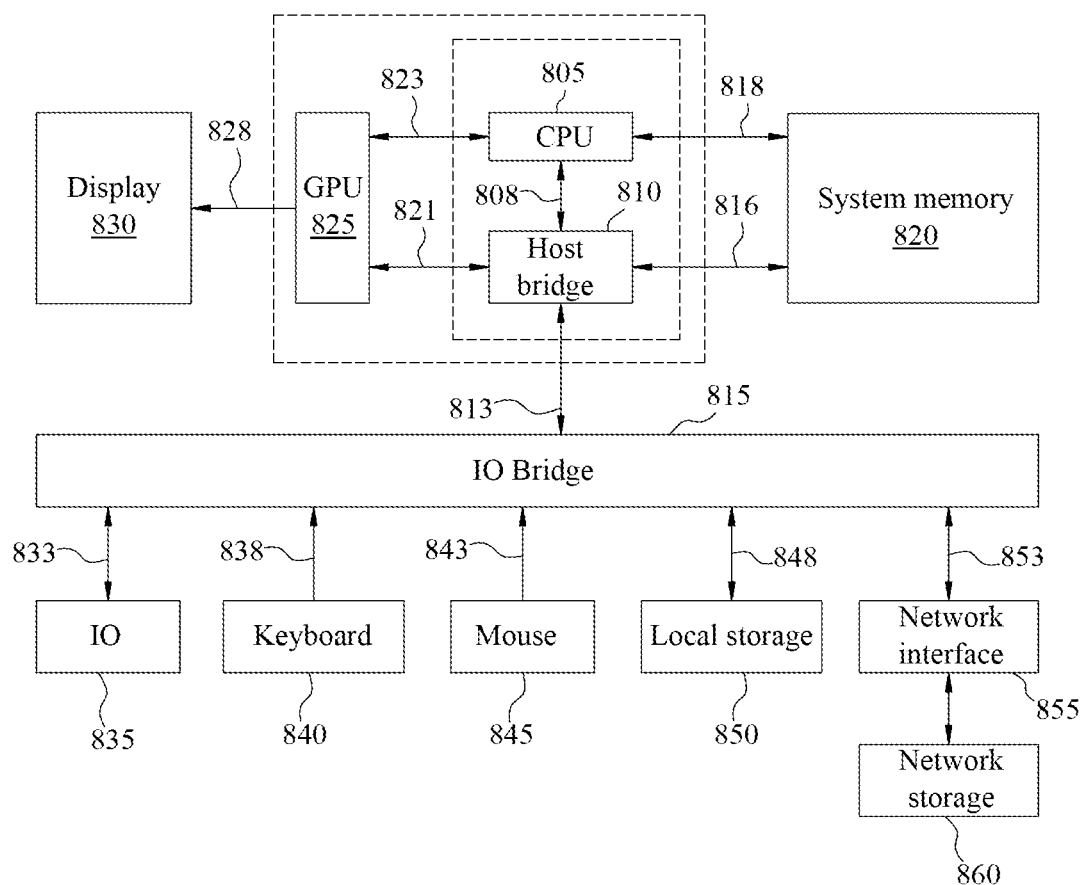
FIG. 8 shows a computer for performing at least part of a method of interactive qualitative-quantitative live labeling in accordance with one or more embodiments of the present invention.

FIG. 8 shows a computer 800 for performing at least part of a method of interactive qualitative-quantitative live labeling in accordance with one or more embodiments of the present invention. While computer 800 is merely exemplary of an Intel® x86 instruction set architecture computing system, one of ordinary skill in the art will appreciate that computer 800 may be any other type or kind of computer capable of executing software instructions that perform at least part of a method of interactive qualitative-quantitative live labeling in accordance with one or more embodiments of the present invention.

Computer 800 may include one or more processors, sometimes referred to as central processing units ("CPUs") 805, host bridge 810, input/output ("IO") bridge 815, graphics processing units ("GPUs") 825, and/or application-specific integrated circuits ("ASICs") (not shown) disposed on one or more printed circuit boards (not shown) that perform computational operations in accordance with an instruction set architecture ("ISA"). Each of the one or more CPUs 805, GPUs 825, or ASICs (not shown) may be a single-core (not shown) device or a multi-core (not shown) device. Multi-core devices typically include a plurality of cores (not shown) disposed on the same physical die (not shown) or a plurality of cores (not shown) disposed on multiple die (not shown) that are collectively disposed within the same mechanical package (not shown).

CPU 805 may be a general-purpose computational device typically configured to execute software instructions for a specific instruction set architecture. CPU 805 may include an interface 808 to host bridge 810, an interface 818 to system memory 820, and an interface 823 to one or more IO devices, such as, for example, one or more GPUs 825. GPU 825 may be a specialized computational device typically configured to perform graphics functions related to frame buffer manipulation. However, one of ordinary skill in the art will recognize that GPU 825 may be used to perform computationally intensive mathematical functions, including training a deep learning algorithm. In certain embodiments, GPU 825 may interface 823 directly with CPU 805 (and interface 818 with system memory 820 through CPU 805). In other embodiments, GPU 825 may interface 821 with host bridge 810 (and interface 816 with system memory 820 through host bridge 810 or interface 818 with system memory 820 through CPU 805 depending on the application or design). In still other embodiments, GPU 825 may interface 833 with IO bridge 815 (and interface 816 with system memory 820 through host bridge 810 or interface 818 with system memory 820 through CPU 805 depending on the application or design). One or ordinary skill in the art will appreciate that the functionality of GPU 825 may be integrated, in whole or in part, with CPU 805.

Host bridge 810 may be an interface device that interfaces between the one or more computational devices (e.g., CPUs 805, GPUs 825, ASICs) and IO bridge 815 and, in some embodiments, system memory 820. Host bridge 810 may include an interface 808 to CPU 805, an interface 813 to IO bridge 815, for embodiments where CPU 805 does not include an interface 818 to system memory 820, an interface 816 to system memory 820, and for embodiments where CPU 805 does not include an integrated GPU 825 or an interface 823 to GPU 825, an interface 821 to GPU 825. One or ordinary skill in the art will appreciate that the functionality of host bridge 810 may be integrated, in whole or in part, with CPU 805. IO bridge 815 may be an interface device that interfaces between the one or more computational devices (e.g., CPUs 805, GPUs 825, ASICs) and various IO devices (e.g., 840, 845) and IO expansion, or add-on, devices (not independently illustrated). IO bridge 815 may include an interface 813 to host bridge 810, one or more interfaces 833 to one or more IO expansion devices 835, an interface 838 to keyboard 840, an interface 843 to mouse 845, an interface 848 to one or more local storage devices 850, and an interface 853 to one or more network interface devices 855. One or ordinary skill in the art will appreciate that the functionality of IO bridge 815 may be integrated, in whole or in part, with CPU 805 and/or host bridge 810. Each local storage device 850, if any, may be a solid-state memory device, a solid-state memory device array, a hard disk drive, a hard disk drive array, or any other non-transitory computer readable medium. Network interface device 855 may provide one or more network interfaces including any network protocol suitable to facilitate networked communications.

Computer 800 may include one or more network-attached storage devices 860 in addition to, or instead of, one or more local storage devices 850. Each network-attached storage device 860, if any, may be a solid-state memory device, a solid-state memory device array, a hard disk drive, a hard disk drive array, or any other non-transitory computer readable medium. Network-attached storage device 860 may or may not be collocated with computing system 800 and may be accessible to computing system 800 via one or more network interfaces provided by one or more network interface devices 855.

One of ordinary skill in the art will recognize that computer 800 may be a conventional computing system or an application-specific computing system (not shown). In certain embodiments, an application-specific computing system (not shown) may include one or more ASICs (not shown) that perform one or more specialized functions in a more efficient manner. The one or more ASICs (not shown) may interface directly with CPU 805, host bridge 810, or GPU 825 or interface through 10 bridge 815. Alternatively, in other embodiments, an application-specific computing system (not shown) may be reduced to only those components necessary to perform a desired function in an effort to reduce one or more of chip count, printed circuit board footprint, thermal design power, and power consumption. The one or more ASICs (not shown) may be used instead of one or more of CPU 805, host bridge 810, 10 bridge 815, or GPU 825. In such systems, the one or more ASICs may incorporate sufficient functionality to perform certain network and computational functions in a minimal footprint with fewer component devices.

As such, one of ordinary skill in the art will recognize that CPU 805, host bridge 810, IO bridge 815, GPU 825, or ASIC (not shown) or a subset, superset, or combination of functions or features thereof, may be integrated, distributed, or excluded, in whole or in part, based on an application, design, or form factor in accordance with one or more embodiments of the present invention. Thus, the description of computer 800 is merely exemplary and not intended to limit the type, kind, or configuration of component devices that constitute a computer 800 suitable for executing software instructions in accordance with one or more embodiments of the present invention. Notwithstanding the above, one of ordinary skill in the art will recognize that computer 800 may be a standalone, laptop, desktop, industrial, server, blade, or rack mountable system and may vary based on an application or design.

Advantages of one or more embodiments of the present invention may include one or more of the following:

In one or more embodiments of the present invention, a method of interactive qualitative-quantitative live labeling expedites the development of a labeled training dataset for complex deep learning applications of machine learning AI by live labeling while training.

In one or more embodiments of the present invention, a method of interactive qualitative-quantitative live labeling uses a live model to provide near real-time feedback on the qualitative labeling effort, while the labeling is being performed.

In one or more embodiments of the present invention, a method of interactive qualitative-quantitative live labeling uses a live model that gradually improves in its ability to predictively label one or more aspects or features of interest in training data.

In one or more embodiments of the present invention, a method of interactive qualitative-quantitative live labeling uses a live model that reduces the amount of time required to qualitatively label training data that decreases in a non-linear fashion over time.

In one or more embodiments of the present invention, a method of interactive qualitative-quantitative live labeling uses a live model that provides nearly instantaneous feedback to the labeler as the qualitative labeling task is being performed, resulting in substantially more acceptably labeled instances of training data and, over time, a live model that is continuously updated as each instance of acceptably labeled training data is added to the model, that can accurately predict labels of one or more features of interest with a high degree of accuracy.

In one or more embodiments of the present invention, a method of interactive qualitative-quantitative live labeling while training substantially improves the quality of qualitative labeling of training data with feedback from quantitative training, substantially reduces the amount of time required to qualitatively label training data, and substantially reduces the amount of time required to quantitatively train on labeled training data.

In one or more embodiments of the present invention, a method of interactive qualitative-quantitative live labeling while training improves the quality of qualitative labeling of training data by focusing on individual instances of training data that are qualitatively labeled, then immediately and briefly quantitatively training on the labeled instance of training data, and then using the predicted labels from the quantitative training to improve the qualitative labeling, in a process that is repeated for each instance of training data until that instance of training data is properly labeled and the qualitative labels and predicted labels are substantially the same.

In one or more embodiments of the present invention, a method of interactive qualitative-quantitative live labeling while training reduces the amount of time required to qualitatively label training data by focusing on individual instances of training data that are qualitatively labeled, then immediately and briefly quantitatively training on the labeled instance of training data, and then using the predicted labels from the quantitative training to improve the qualitative labeling, in a process that is repeated for each instance of training data until that instance of training data is properly labeled and the qualitative labels and predicted labels are substantially the same. This process may be repeated for additional instances of training data until the model accurately predicts labels such that the qualitative labeling process is reduced over time to mere verification of predicted labels. As such, the amount of time required to qualitatively label is reduced for each successive instance of training data that is labeled until the model can accurately predict labels. In contrast to conventional labeling processes, interactive qualitative-quantitative labeling while training requires less time to label each successive instance of training data, until it requires little to no time at all.

In one or more embodiments of the present invention, a method of interactive qualitative-quantitative live labeling while training reduces the amount of time required to quantitatively train on labeled training data. The presentment of improperly labeled training data frustrates the training process as the optimization procedure requires multiple passes through each and every instance of training data in an effort to find correlation, where none exists with respect to improperly labeled data. Advantageously, a method of interactive qualitative-quantitative labeling while training resolves labeling issues one instance of training data at a time until the algorithm accurately predicts labels on new instances of training data. Because the algorithm is presented with more properly labeled training data with each qualitative-quantitative cycle, high correlation is more easily achieved by the optimization procedure, requiring fewer passes through training data, and the amount of time required to train on the entire training dataset is substantially reduced.

In one or more embodiments of the present invention, a method of interactive qualitative-quantitative live labeling while training simplifies the qualitative training process.

In one or more embodiments of the present invention, a method of interactive qualitative-quantitative labeling while training reduces the costs associated with qualitative training.

In one or more embodiments of the present invention, a method of interactive qualitative-quantitative live labeling while training reduces the computational complexity of quantitative training.

In one or more embodiments of the present invention, a method of interactive qualitative-quantitative live labeling while training reduces the computational demand of quantitative training.

In one or more embodiments of the present invention, a method of interactive qualitative-quantitative live labeling while training reduces the amount of time required for quantitative training.

In one or more embodiments of the present invention, a method of interactive qualitative-quantitative live labeling while training reduces the costs associated with quantitative training.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should only be limited by the appended claims.

What is claimed is:

1. A method of interactive qualitative-quantitative live labeling a training dataset with real-time feedback while labeling each instance of training data to reduce an amount of time required to produce a complete labeled training dataset for training an intended model of a second deep learning algorithm for operative use, the method comprising:

for each instance of training data in the training dataset to be labeled:
submitting the instance of training data to a live model comprising a first deep learning algorithm in a live training mode;
generating one or more initial predictions of features of interest in an instance of training data in the training dataset with the live model;
converting the one or more initial predictions of features of interest into one or more provisional qualitative labels applied to the instance of training data;
receiving qualitative labels for one or more features of interest in the instance of training data from an operator, wherein the qualitative labels correspond to additions to, deletions from, or modifications of, the one or more provisional qualitative labels or acceptance of the one or more provisional qualitative labels, resulting in a qualitatively labeled instance of training data;
quantitatively training the live model on the qualitatively labeled instance of training data and all instances of training data previously designated as acceptably labeled to update the live model;
generating one or more predictions of features of interest in the instance of training data with the updated live model;
receiving, from the operator, a determination as to whether the one or more predictions of features of interest in the instance of training data are a same as the one or more qualitative labels applied to the instance of training data;
designating the instance of training data as being acceptably labeled if the one or more predictions are determined to be the same as the one or more qualitative labels, then qualitatively training the live model on the instance of training data and all other instances of training data designated as acceptably labeled to update the live model, and advancing to the next instance of training data; and
repeating the receiving qualitative labels, the qualitatively training the live model, the generating one or more predictions of features of interest, and the receiving from the operator the determination, until the determination is that the one or more predictions of features of interest are the same as the one or more qualitative labels applied to the instance of training data,
wherein the first deep learning algorithm of the live model has a depth, width, size, capacity, and complexity less than the second deep learning algorithm of the intended model, and
wherein an amount of time required to qualitatively label each instance of training data in the training dataset decreases over time as additional instances of training data are designated as acceptably labeled and used to update the live model.

2. The method of claim 1, wherein the first deep learning algorithm of the live model comprises model parameters that have values that are initialized to zero, predetermined values, or random values.

3. The method of claim 1, wherein the first deep learning algorithm of the live model comprises an artificial neural network, a radial basis function network, a convolutional neural network, a recurrent neural network, a long short-term memory network, a self-organizing map, an autoencoder, or a deep belief network.

4. The method of claim 1, wherein the labeled training dataset comprises all instances of training data designated as acceptably labeled.

5. The method of claim 1, wherein the second deep learning algorithm of the intended model comprises an artificial neural network, a radial basis function network, a convolutional neural network, a recurrent neural network, a long short-term memory network, a self-organizing map, an autoencoder, or a deep belief network.

6. The method of claim 1, wherein the training dataset comprises tens of thousands, hundreds of thousands, or millions of instances of training data.

7. The method of claim 1, wherein the training dataset comprises numeric, alphanumeric, or graphical data.

8. The method of claim 1, wherein the training dataset comprises nominal, ordinal, discrete, continuous, or graphical data, or combinations thereof.

* * * * *